US012579968B2

(12) United States Patent
Choi et al.

(10) Patent No.: US 12,579,968 B2
(45) Date of Patent: Mar. 17, 2026

(54) METHOD OF DETERMINING END POINT DETECTION TIME AND ELECTRONIC DEVICE FOR PERFORMING THE METHOD

(71) Applicant: Samsung Electronics Co., Ltd., Suwon-si (KR)

(72) Inventors: Myeungyong Choi, Suwon-si (KR); Sungjae Park, Suwon-si (KR); Hyuk Oh, Suwon-si (KR); Seungbeom Ryu, Suwon-si (KR); Junkwon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 254 days.

(21) Appl. No.: 18/363,309

(22) Filed: Aug. 1, 2023

(65) Prior Publication Data

US 2024/0013773 A1    Jan. 11, 2024

Related U.S. Application Data

(63) Continuation of application No. PCT/KR2023/009139, filed on Jun. 29, 2023.

(30) Foreign Application Priority Data

Jul. 6, 2022    (KR) ........................ 10-2022-0083349
Aug. 30, 2022   (KR) ........................ 10-2022-0109021

(51) Int. Cl.
G10L 15/22 (2006.01)
G10L 15/05 (2013.01)
(Continued)

(52) U.S. Cl.
CPC .............. G10L 15/05 (2013.01); G10L 15/22 (2013.01); G10L 15/1815 (2013.01); G10L 2015/223 (2013.01); G10L 15/30 (2013.01)

(58) Field of Classification Search
CPC ... G10L 15/22; G10L 2015/223; G10L 25/87; G10L 15/04; G10L 15/05; G10L 25/78;
(Continued)

(56) References Cited

U.S. PATENT DOCUMENTS 8,781,832 B2 * 7/2014 Comerford ............. G10L 15/28
704/251
9,437,186 B1    9/2016 Liu et al.
(Continued)

FOREIGN PATENT DOCUMENTS

JP        07-104676 B2    11/1995
JP       2007-256482 A    10/2007
(Continued)

OTHER PUBLICATIONS

International Search Report dated Sep. 26, 2023, issued in International Patent Application No. PCT/KR2023/009139.
(Continued)

*Primary Examiner* — Vijay B Chawan
(74) *Attorney, Agent, or Firm* — Jefferson IP Law, LLP

(57) ABSTRACT

A method of determining an End Point Detection (EPD) time and an electronic device for performing the method are provided. The electronic device includes a processor and a memory electrically connected to the processor and configured to store commands executed by the processor. The processor may be configured to recognize an utterance when the commands are executed, determine an End Point Detection (EPD) time for terminating recognition of the utterance based on utterance data stored in the memory, and terminate the recognition of the utterance when the utterance is not additionally input within the EPD time. The utterance data may include sentence data, which includes a pattern related to a sentence type of the utterance, and word data, which includes a word of the utterance.

20 Claims, 10 Drawing Sheets

(51) Int. Cl.
*G10L 15/18* (2013.01)
*G10L 15/30* (2013.01)

(58) Field of Classification Search
CPC . G10L 15/16; G10L 15/1822; G10L 15/1815;
G10L 15/30; G10L 15/183; G10L 25/30;
G10L 25/51; G10L 25/93
USPC ........................................................ 704/251
See application file for complete search history.

(56) References Cited

U.S. PATENT DOCUMENTS

| | | | | | |
|---|---|---|---|---|---|
| 9,607,613 | B2* | 3/2017 | Buchanan | ............... | G10L 25/87 |
| 10,121,471 | B2* | 11/2018 | Hoffmeister | ............ | G10L 25/93 |
| 10,186,254 | B2* | 1/2019 | Williams | ................ | G10L 15/04 |
| 10,475,441 | B2* | 11/2019 | Lee | ......................... | G10L 15/05 |
| 10,943,606 | B2* | 3/2021 | Doshi | ..................... | G10L 15/19 |
| 12,125,498 | B2* | 10/2024 | Ryu | ........................ | G10L 15/02 |
| 2006/0241948 | A1* | 10/2006 | Abrash | ................... | G10L 25/87 |
| | | | | | 704/E11.005 |
| 2007/0225982 | A1* | 9/2007 | Washio | ................... | G10L 15/22 |
| | | | | | 704/E15.04 |
| 2018/0090127 | A1 | 3/2018 | Hofer et al. | | |
| 2018/0357999 | A1* | 12/2018 | Lee | ......................... | G10L 15/22 |
| 2019/0318759 | A1* | 10/2019 | Doshi | ..................... | G10L 15/04 |
| 2019/0378493 | A1 | 12/2019 | Kim et al. | | |
| 2020/0125603 | A1* | 4/2020 | Ha | .......................... | G10L 15/22 |
| 2021/0104232 | A1* | 4/2021 | Lee | ......................... | G06N 3/08 |
| 2021/0193176 | A1 | 6/2021 | Doshi et al. | | |
| 2021/0264916 | A1* | 8/2021 | Kim | ....................... | G10L 15/22 |
| 2022/0254369 | A1* | 8/2022 | Ryu | ........................ | H04R 1/08 |
| 2023/0035947 | A1* | 2/2023 | Wan | ....................... | G10L 15/04 |
| 2023/0298586 | A1* | 9/2023 | Park | ....................... | G10L 15/22 |
| 2023/0368781 | A1* | 11/2023 | Choi | ....................... | G10L 25/78 |
| 2024/0013773 | A1* | 1/2024 | Choi | ..................... | G06F 40/279 |

FOREIGN PATENT DOCUMENTS

| | | |
|---|---|---|
| JP | 2020-091405 A | 6/2020 |
| KR | 10-2018-0084394 A | 7/2018 |
| KR | 10-2018-0133703 A | 12/2018 |
| KR | 10-2020-0109830 A | 9/2020 |
| KR | 10-2020-0109832 A | 9/2020 |
| WO | 2022-169301 A1 | 8/2022 |

OTHER PUBLICATIONS

Extended European Search Report dated Apr. 4, 2025; European Appln. No. 23835751.1-1207 / 4517751 PCT/KR2023009139.

* cited by examiner

| Utterance | Count of inputs of utterance 510 | Date 520 | Category 530 | Count of inputs of category 540 |
|---|---|---|---|---|
| Play song A | 1 | March 1, 2022 | Music 530-1 | 33 |
| Play song B | 2 | March 2, 2022 | | |
| Tomorrow's weather | 1 | March 4, 2022 | Weather 530-2 | 20 |
| It's raining | 1 | March 10, 2022 | | |
| Call dad | 1 | March 11, 2022 | Call 530-3 | 10 |

[Sentence embedding clustering by using K-means]

Proportion for each category

| Utterance | Count of utterance | Category |
|---|---|---|
| Play XX songs | 1 | Music |
| XX song | 2 | Music |
| XX weather | 1 | Weather |
| XX rain | 1 | Weather |
| Call XX | 1 | Call |

| Utterance | Count of utterance | Category | Type |
|---|---|---|---|
| Song | 3 | Music | Complete |
| Play | 3 | Music | Clear complete |
| Weather | 1 | Weather | Complete |
| Rain | 1 | Weather | Clear complete |
| Call | 1 | Call | Complete |
| Tomorrow | 1 | Weather | Clear incomplete |
| Dad | 1 | Call | Incomplete |
| Now | 1 | Weather | Clear incomplete |
| Singer A | 1 | Music | Ambiguous |

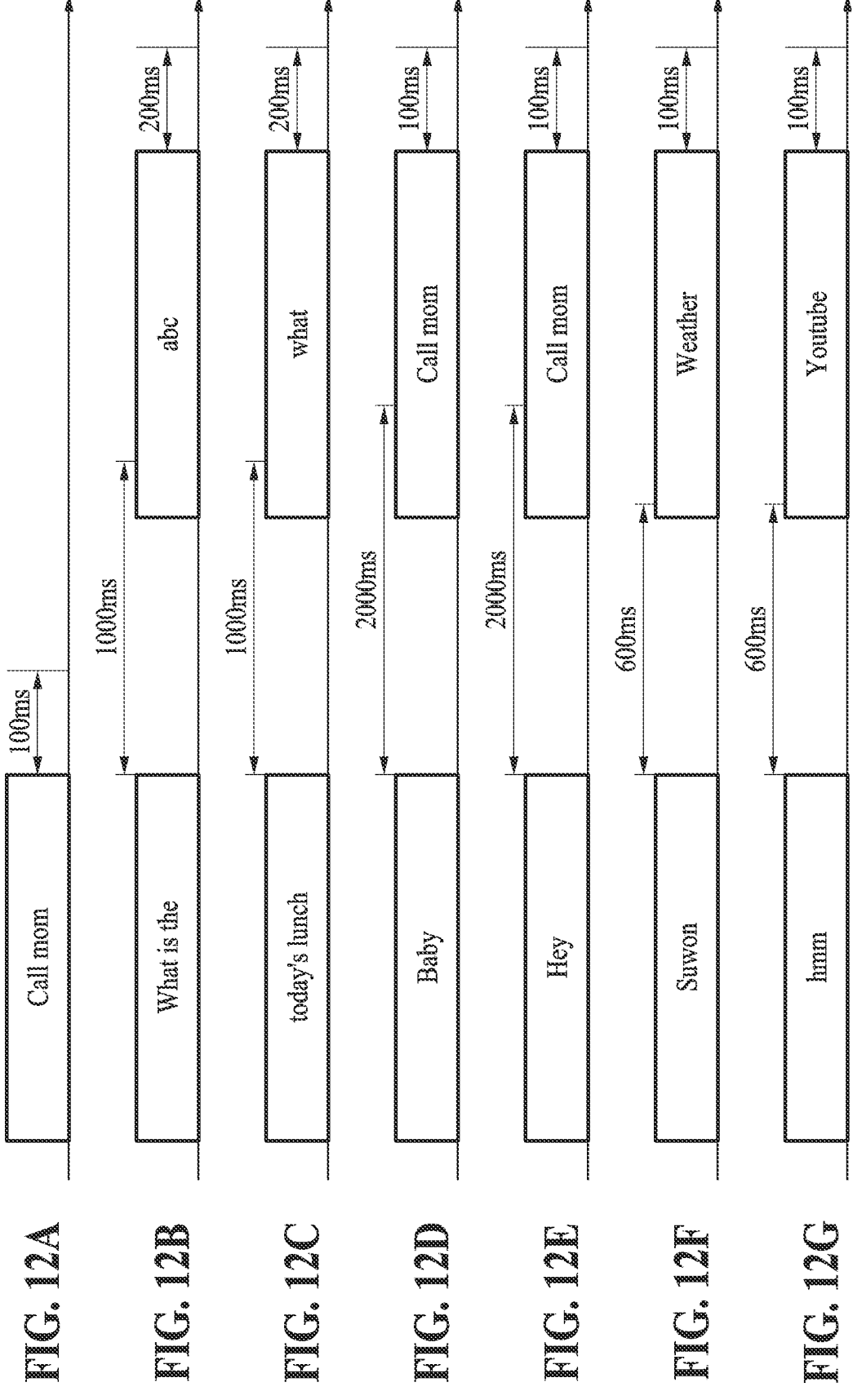

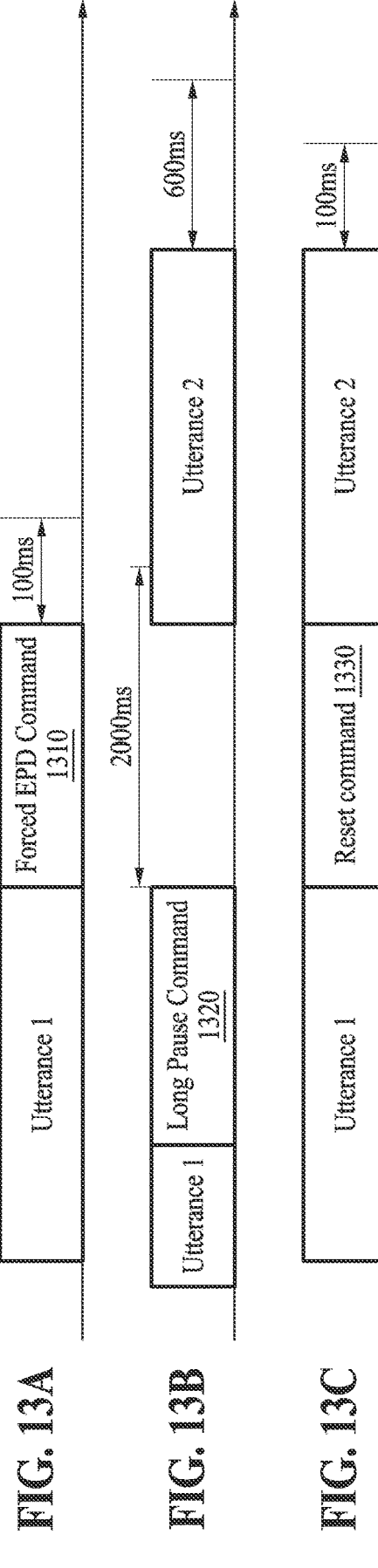

METHOD OF DETERMINING END POINT DETECTION TIME AND ELECTRONIC DEVICE FOR PERFORMING THE METHOD

CROSS-REFERENCE TO RELATED APPLICATION(S)

This application is a continuation application, claiming priority under § 365(c), of an International application No. PCT/KR2023/009139, filed on Jun. 29, 2023, which is based on and claims the benefit of a Korean patent application number 10-2022-0083349, filed on Jul. 6, 2022, in the Korean Intellectual Property Office, and of a Korean patent application number 10-2022-0109021, filed on Aug. 30, 2022, in the Korean Intellectual Property Office, the disclosure of each of which is incorporated by reference herein in its entirety.

BACKGROUND

1. Field

The disclosure relates to a method of determining an end point detection time based on a user's individual utterance history and an electronic device for performing the method.

2. Description of Related Art

Various electronic devices are distributed with a speech recognition function equipped therein to provide a service based on a user's utterance. In speech recognition, determining whether a user's utterance is completed may have a significant impact on speech recognition performance.

Voice Activity Detection (VAD) using a voice signal may be used to determine whether the user's utterance is completed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of determining an end point detection time based on a user's individual utterance history and an electronic device for performing the method.

Additional aspects will be set forth in part in the description which follows and, in part, will be apparent from the description, or may be learned by practice of the presented embodiments.

In accordance with an aspect of the disclosure, an electronic device is provided. The electronic device includes a processor and a memory electrically connected to the processor and configured to store commands executed by the processor. The processor may be configured to recognize an utterance when the commands are executed. The processor may be configured to determine an End Point Detection (EPD) time for terminating the recognition of the utterance, based on utterance data stored in the memory. The processor may be configured to terminate the recognition of the utterance when the utterance is not additionally input within the EPD time. The utterance data may include sentence data, which includes the pattern related to a sentence type of the utterance, and word data, which includes a word of the utterance.

In accordance with another aspect of the disclosure, an electronic device is provided. The electronic device includes a processor and a memory electrically connected to the processor and configured to store commands executed by the processor. When the commands are executed, the processor may be configured to determine a category of an utterance. The processor may be configured to compare a pattern of the utterance to a pattern stored in utterance data, based on the utterance data corresponding to the category. When the pattern of the utterance is different from the pattern stored in the utterance data, the processor may be configured to determine whether the utterance is a complete sentence, an incomplete sentence, or an ambiguous sentence. The processor may be configured to determine an EPD time for terminating recognition of the utterance, based on at least one of a result of the comparing of the pattern of the utterance to the pattern stored in the utterance data and whether the utterance is the complete sentence, the incomplete sentence, or the ambiguous sentence. The processor may be configured to terminate the recognition of the utterance when the utterance is not additionally input within the EPD time. The utterance data may include sentence data, which includes the pattern related to a sentence type of the utterance, and word data, which includes a word of the utterance.

In accordance with another aspect of the disclosure, a method of determining an EPD time is provided. The method includes recognizing an utterance, determining an EPD time for terminating recognition of the utterance based on utterance data 112 stored in a memory 130, and when the utterance is not additionally input within the EPD time, terminating the recognition of the utterance. The utterance data may include sentence data 113, which includes a pattern related to a sentence type of the utterance 195, and word data, which includes a word of the utterance 195.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 is a diagram illustrating sentence data according to an embodiment of the disclosure;

FIG. 11 is a diagram illustrating word data according to an embodiment of the disclosure;

FIGS. 12A, 12B, 12C, 12D, 12E, 12F, and 12G are diagrams illustrating an EPD time determined by an electronic device for each utterance, according to various embodiments of the disclosure; and FIGS. 13A, 13B, and 13C are diagrams illustrating an operation in which an electronic device determines an EPD time according to an EPD command according to various embodiments of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
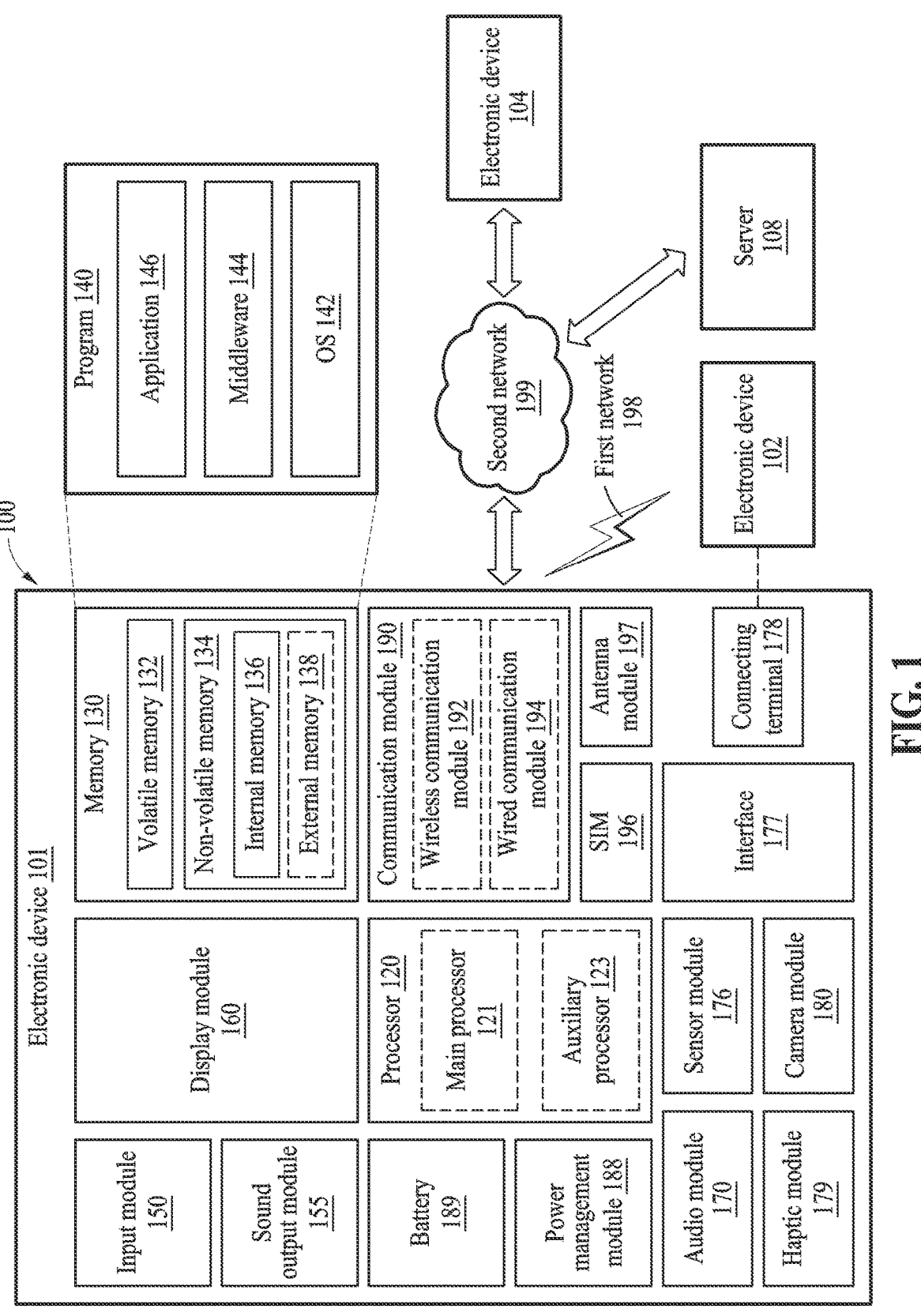
FIG. 1 is a block diagram illustrating an electronic device in a network environment, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to another embodiment, the electronic device 101 may include a processor 120, a memory 130, an input module 150, a sound output module 155, a display module 160, an audio module 170, and a sensor module 176, an interface 177, a connecting terminal

178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to yet another embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a nonvolatile memory 134. According to yet another embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 is adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to yet another embodiment, the auxiliary processor 123 (e.g., an ISP or a CP) may be implemented as a portion of another component (e.g., the camera module 180 or the communication module 190) that is functionally related to the auxiliary processor 123. According to yet another embodiment, the auxiliary processor 123 (e.g., an NPU) may include a hardware structure specified for artificial intelligence (AI) model processing. An AI model may be generated through machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to yet another embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to yet another embodiment, the display module 160 may include a touch sensor adapted to sense a touch, or a pressure sensor adapted to measure an intensity of a force incurred by the touch.

The audio module 170 may convert a sound into an electric signal and vice versa. According to yet another embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to yet another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to yet another embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to yet another embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to yet another embodiment, the haptic module 179 may include, for example, a motor, a piezoelectric element, or an electric stimulator.

The camera module 180 may capture a still image and moving images. According to yet another embodiment, the camera module 180 may include one or more lenses, image sensors, ISPs, or flashes.

The power management module 188 may manage power supplied to the electronic device 101. According to yet another embodiment, the power management module 188 may be implemented as, for example, at least a part of a power management integrated circuit (PMIC).

The battery 189 may supply power to at least one component of the electronic device 101. According to yet another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support a direct (e.g., wired) communication or a wireless communication. According to yet another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to yet another embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to yet another embodiment, the antenna module 197 may include an antenna including a radiating element including a conductive material or a conductive pattern formed in or on a substrate (e.g., a printed circuit board (PCB)). According to yet another embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to yet another embodiment, another component (e.g., a radio frequency integrated circuit (RFIC)) other than the radiating element may be additionally formed as a part of the antenna module 197.

According to yet another embodiment, the antenna module 197 may form a mmWave antenna module. According to yet another embodiment, the mmWave antenna module may include a PCB, an RFIC disposed on a first surface (e.g., a bottom surface) of the PCB or adjacent to the first surface and capable of supporting a designated a high-frequency band (e.g., a mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to yet another embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to yet another embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, cloud computing, distributed computing, mobile edge computing (MEC), or client-server computing technology may be used, for example. The electronic device 101 may provide ultra-low-latency services using, e.g., distributed computing or MEC. In yet another embodiment, the external electronic device 104 may include an Internet-of-things (IoT) device. The server 108 may be an intelligent server using machine learning and/or a neural network. According to yet another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
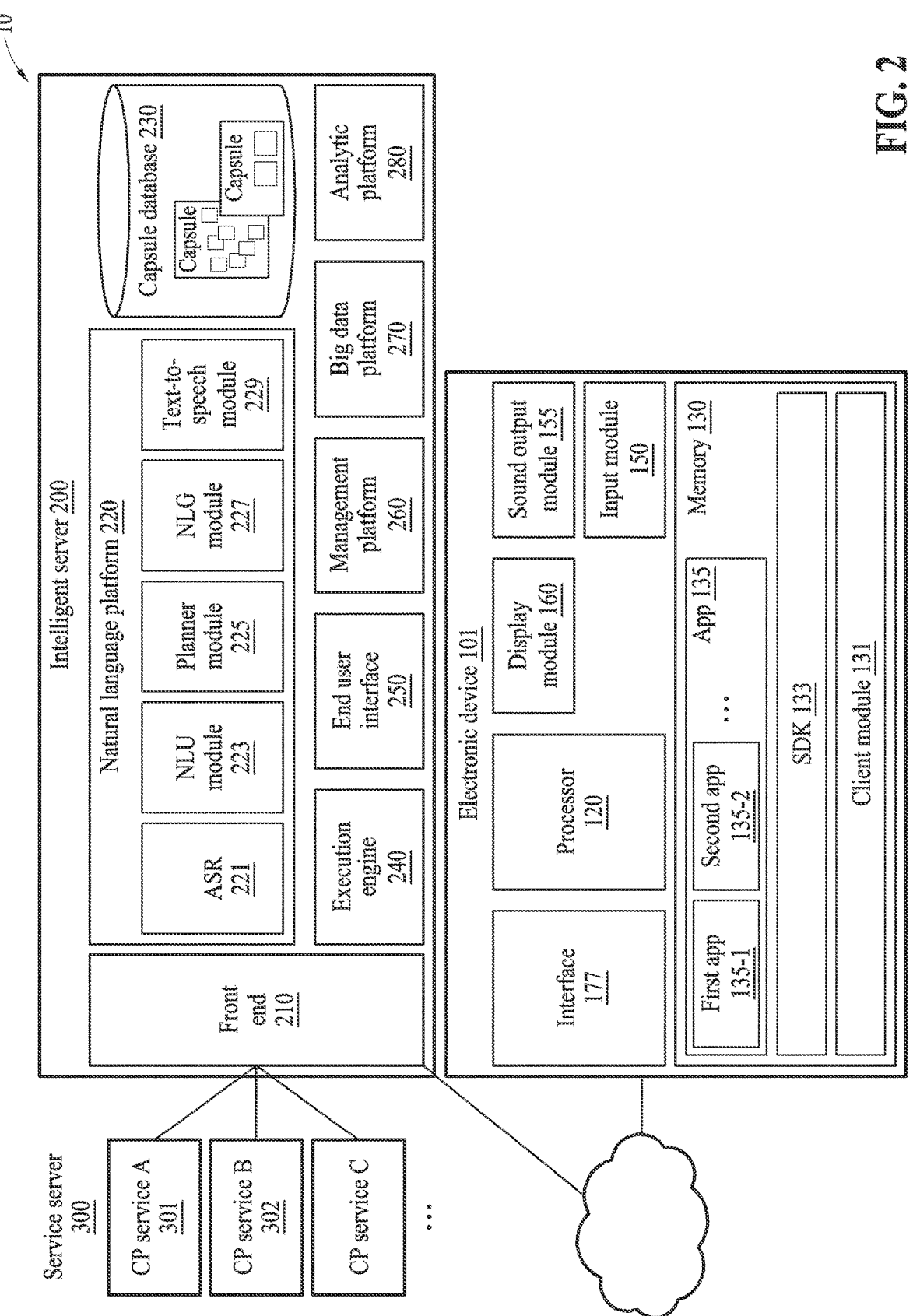
FIG. 2 is a block diagram illustrating an integrated intelligence system according to an embodiment of the disclosure.

FIG. 2 is a block diagram illustrating an integrated intelligence system according to an embodiment of the disclosure.

Referring to FIG. 2, an integrated intelligence system 10 may include an electronic device 101, an intelligent server 200, and a service server 300. The service server 300 may include at CP service A 301 and CP service B 302.

The electronic device 101 may be a terminal device (or an electronic device) connectable to the Internet, and may be, for example, a mobile phone, a smartphone, a personal digital assistant (PDA), a notebook computer, a television (TV), a white home appliance, a wearable device, a head-mounted display (HMD), or a smart speaker.

According to the shown embodiment, the electronic device 101 may include an interface 177 (e.g., the interface 177 of FIG. 1), an input module 150 (e.g., the input module 150 of FIG. 1), a speaker 155 (e.g., the sound output module 155 of FIG. 1), a display module 160 (e.g., the display module 160 of FIG. 1), a memory 130 (e.g., the memory 130 of FIG. 1), or a processor 120 (e.g., the processor 120 of FIG. 1). The components listed above may be operationally or electrically connected to each other.

The interface 177 may be connected to an external device and configured to transmit and receive data to and from the external device. The input module 150 may receive a sound (e.g., a user utterance) and convert the sound into an electrical signal. The sound output module 155 may output the electrical signal as a sound (e.g., an utterance).

The display module 160 may be configured to display an image or video. The display module 160 may also display a graphical user interface (GUI) of an app (or an application program) being executed. The display module 160 may receive a touch input through a touch sensor. For example, the display module 160 receives a text input through a touch sensor in an on-screen keyboard area displayed in the display module 160.

The memory 130 may store a client module 131, a software development kit (SDK) 133, and a plurality of apps 135. The client module 131 and the SDK 133 may configure a framework (or a solution program) for performing general-purpose functions. In addition, the client module 131 or the SDK 133 may configure a framework for processing a user input (e.g., a voice input, a text input, or a touch input).

The plurality of apps 135 stored in the memory 130 may be programs for performing designated functions. The plurality of apps 135 may include a first app 135_1, a second app 135_2, and the like. Each of the plurality of apps 135 may include a plurality of actions for performing a designated function. For example, the apps may include an alarm app, a messaging app, and/or a scheduling app. The plurality of apps 135 may be executed by the processor 120 to sequentially execute at least a portion of the plurality of actions.

The processor 120 may control the overall operation of the electronic device 101. For example, the processor 120 is electrically connected to the interface 177, the input module 150, the sound output module 155, and the display module 160 to perform a designated operation.

The processor 120 may also perform the designated function by executing the program stored in the memory 130. For example, the processor 120 executes at least one of the client module 131 or the SDK 133 to perform the following operation for processing a user input. The processor 120 may control the operation of the plurality of apps 135 through, for example, the SDK 133. The following operation which is the operation of the client module 131 or the SDK 133 may be performed by the processor 120.

The client module 131 may receive a user input. For example, the client module 131 receives a voice signal corresponding to a user utterance sensed through the input module 150. As another example, the client module 131 receives a touch input sensed through the display module 160. As still another example, the client module 131 receives a text input sensed through a keyboard or an on-screen keyboard. In addition, the client module 131 may receive various types of user inputs sensed through an input module included in the electronic device 101 or an input module connected to the electronic device 101. The client module 131 may transmit the received user input to the intelligent server 200. The client module 131 may transmit state information of the electronic device 101 together with the received user input to the intelligent server 200. The state information may be, for example, execution state information of an app.

The client module 131 may receive a result corresponding to the received user input. For example, when the intelligent server 200 is capable of calculating a result corresponding to the received user input, the client module 131 may receive the result corresponding to the received user input. The client module 131 may display the received result on the display module 160. Further, the client module 131 may output the received result in an audio form through the sound output module 155.

The client module 131 may receive a plan corresponding to the received user input. The client module 131 may display results of executing a plurality of actions of an app according to the plan on the display module 160. For example, the client module 131 sequentially displays the results of executing the plurality of actions on the display module 160 and output the results in an audio form through the sound output module 155. For example, the electronic device 101 displays only a portion of the results of executing the plurality of actions (e.g., a result of the last action) on the display module 160 and output the portion of the results in an audio form through the sound output module 155.

According to an embodiment, the client module 131 may receive a request for obtaining information necessary for calculating a result corresponding to the user input from the intelligent server 200. According to another embodiment, the client module 131 may transmit the necessary information to the intelligent server 200 in response to the request.

The client module 131 may transmit information on the results of executing the plurality of actions according to the plan to the intelligent server 200. The intelligent server 200 may confirm that the received user input has been correctly processed using the information on the results.

The client module 131 may include an utterance recognition module. According to yet another embodiment, the client module 131 may recognize a voice input for performing a limited function through the utterance recognition module. For example, the client module 131 executes an intelligent app for processing a voice input to perform an organic operation through a designated input (e.g., Wake up!).

The intelligent server 200 may receive information related to a user voice input from the electronic device 101 through a communication network. According to yet another embodiment, the intelligent server 200 may change data related to the received voice input into text data. According to yet another embodiment, the intelligent server 200 may generate a plan for performing a task corresponding to the user voice input based on the text data.

According to yet another embodiment, the plan may be generated by an artificial intelligence (AI) system. The artificial intelligence system may be a rule-based system or a neural network-based system (e.g., a feedforward neural network (FNN) or a recurrent neural network (RNN)). Alternatively, the artificial intelligence system may be a combination thereof or other artificial intelligence systems. According to yet another embodiment, the plan may be selected from a set of predefined plans or may be generated in real time in response to a user request. For example, the AI system selects at least one plan from among the predefined plans.

The intelligent server 200 may transmit a result according to the generated plan to the electronic device 101 or transmit the generated plan to the electronic device 101. According to yet another embodiment, the electronic device 101 may display the result according to the plan on the display module 160. According to yet another embodiment, the electronic device 101 may display a result of executing an action according to the plan on the display module 160.

The intelligent server 200 may include a front end 210, a natural language platform 220, a capsule database (DB) 230, an execution engine 240, an end user interface 250, a management platform 260, a big data platform 270, or an analytic platform 280.

The front end 210 may receive the received user input from the electronic device 101. The front end 210 may transmit a response corresponding to the user input.

According to yet another embodiment, the natural language platform 220 may include an automatic speech recognition (ASR) module 221, a natural language understanding (NLU) module 223, a planner module 225, a natural language generator (NLG) module 227, or a text-to-utterance (TTS) module 229.

The ASR module 221 may convert data related to the voice input received from the electronic device 101 into text data. The NLU module 223 may discern an intent of a user using the text data of the voice input. For example, the NLU module 223 discerns the intent of the user by performing syntactic analysis or semantic analysis on a user input in the form of text data. The NLU module 223 may discern the meaning of a word extracted from the user input using a linguistic feature (e.g., a grammatical element) of a morpheme or phrase, and determine the intent of the user by matching the discerned meaning of the word to an intent. The NLU module 223 may obtain intent information corresponding to the user's utterance. The intent information may refer to information indicating the user's intent determined by analyzing the text data. The intent information may include information indicating an operation or a function that the user intends to execute by using a device.

The planner module 225 may generate a plan using a parameter and the intent determined by the NLU module 223. According to yet another embodiment, the planner module 225 may determine a plurality of domains required to perform a task based on the determined intent. The planner module 225 may determine a plurality of actions included in each of the plurality of domains determined based on the intent. According to yet another embodiment, the planner module 225 may determine a parameter required to execute the determined plurality of actions or a result value output by the execution of the plurality of actions. The parameter and the result value may be defined as a concept of a designated form (or class). Accordingly, the plan may include a plurality of actions and a plurality of concepts determined by the intent of the user. The planner module 225 may determine a relationship between the plurality of actions and the plurality of concepts stepwise (or hierarchically). For example, the planner module 225 determines an execution order of the plurality of actions determined based on the intent of the user, based on the plurality of concepts. In other words, the planner module 225 may determine the execution order of the plurality of actions based on the parameter required for the execution of the plurality of actions and results output by the execution of the plurality of actions. Accordingly, the planner module 225 may generate a plan including connection information (e.g., ontology) between the plurality of actions and the plurality of concepts. The planner module 225 may generate the plan using information stored in the capsule DB 230 that stores a set of relationships between concepts and actions.

The NLG module 227 may change designated information into a text form. The information changed to the text form may be in the form of a natural language utterance. The TTS module 229 may change information in a text form into information in an utterance form.

According to yet another embodiment, some or all of the functions of the natural language platform 220 may be implemented in the electronic device 101 as well.

The capsule DB 230 may store information on the relationship between the plurality of concepts and actions corresponding to the plurality of domains. A capsule according to yet another embodiment may include a plurality of action objects (or action information) and concept objects (or concept information) included in the plan. According to yet another embodiment, the capsule DB 230 may store a plurality of capsules in the form of a concept action network (CAN). According to yet another embodiment, the plurality of capsules may be stored in a function registry included in the capsule DB 230.

The capsule DB 230 may include a strategy registry that stores strategy information necessary for determining a plan corresponding to a voice input. The strategy information may include reference information for determining one plan when there are a plurality of plans corresponding to the user input. According to yet another embodiment, the capsule DB 230 may include a follow-up registry that stores information on follow-up actions for suggesting a follow-up action to the user in a designated situation. The follow-up action may include, for example, a follow-up utterance. According to yet another embodiment, the capsule DB 230 may include a layout registry that stores layout information of information outputted through the electronic device 101. According to yet another embodiment, the capsule DB 230 may include a vocabulary registry that stores vocabulary information included in capsule information. According to yet another embodiment, the capsule DB 230 may include a dialog registry that stores information on a dialog (or an interaction) with the user. The capsule DB 230 may update the stored objects through a developer tool. The developer tool may include, for example, a function editor for updating an action object or a concept object. The developer tool may include a vocabulary editor for updating the vocabulary. The developer tool may include a strategy editor for generating and registering a strategy for determining a plan. The developer tool may include a dialog editor for generating a dialog with the user. The developer tool may include a follow-up editor for activating a follow-up objective and editing a follow-up utterance that provides a hint. The follow-up objective may be determined based on a current set objective, a preference of the user, or an environmental condition. In yet another embodiment, the capsule DB 230 may be implemented in the electronic device 101 as well.

The execution engine 240 may calculate a result using the generated plan. The end user interface 250 may transmit the calculated result to the electronic device 101. Accordingly, the electronic device 101 may receive the result and provide the received result to the user. The management platform 260 may manage information used by the intelligent server 200. The big data platform 270 may collect data of the user. The analytic platform 280 may manage a quality of service (QoS) of the intelligent server 200. For example, the analytic platform 280 manages the components and processing rate (or efficiency) of the intelligent server 200.

The service server 300 may provide a designated service (e.g., a food order or hotel reservation) to the electronic device 101. According to yet another embodiment, the service server 300 may be a server operated by a third party. The service server 300 may provide information to be used for generating a plan corresponding to the received voice input to the intelligent server 200. The provided information may be stored in the capsule DB 230. In addition, the service server 300 may provide result information according to the plan to the intelligent server 200.

In the integrated intelligence system 10 described above, the electronic device 101 may provide various intelligent services to the user in response to a user input. The user input may include, for example, an input through a physical button, a touch input, or a voice input.

In yet another embodiment, the electronic device 101 may provide an utterance recognition service through an intelligent app (or an utterance recognition app) stored therein. In this case, for example, the electronic device 101 recognizes a user utterance or a voice input received through the microphone, and provide a service corresponding to the recognized voice input to the user.

In yet another embodiment, the electronic device 101 may perform a designated action alone or together with the intelligent server 200 and/or a service server, based on the received voice input. For example, the electronic device 101 executes an app corresponding to the received voice input and perform a designated action through the executed app.

In yet another embodiment, when the electronic device 101 provides a service together with the intelligent server 200 and/or the service server, the electronic device 101 may detect a user's utterance using the input module 150 and generate a signal (or voice data) corresponding to the detected the user's utterance. The electronic device 101 may transmit the utterance data to the intelligent server 200 using the interface 177.

The intelligent server 200 may generate, as a response to the voice input received from the electronic device 101, a plan for performing a task corresponding to the voice input or a result of performing an action according to the plan. The plan may include, for example, a plurality of actions for performing a task corresponding to a voice input of a user, and a plurality of concepts related to the plurality of actions. The concepts may define parameters input to the execution of the plurality of actions or result values output by the execution of the plurality of actions. The plan may include connection information between the plurality of actions and the plurality of concepts.

The electronic device 101 may receive the response using the interface 177. The electronic device 101 may output a voice signal internally generated by the electronic device 101 to the outside using the sound output module 155, or output an image internally generated by the electronic device 101 to the outside using the display module 160.

Figure 3:
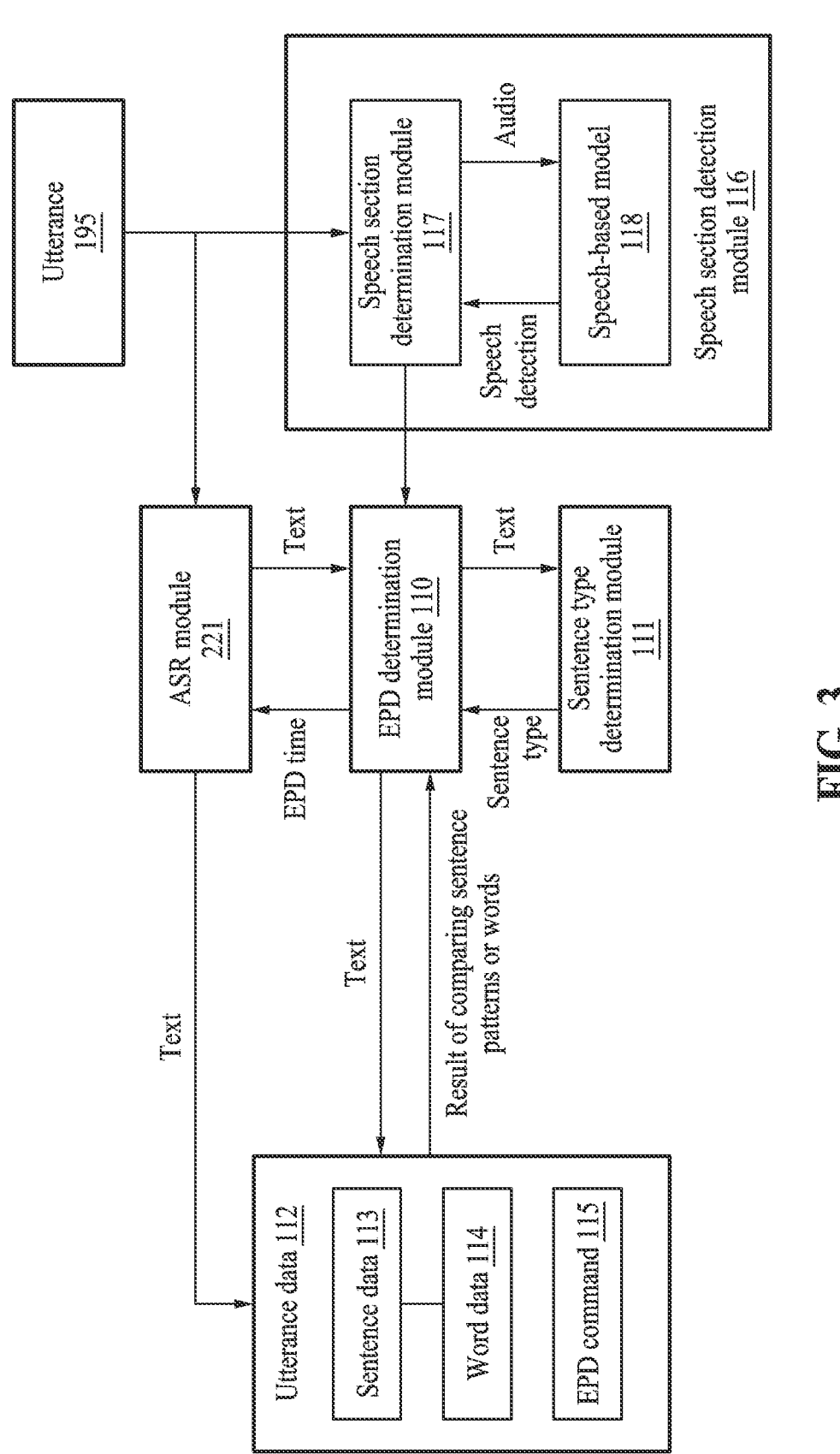
FIG. 3 is a diagram illustrating an operation in which an electronic device determines an End Point Detection (EPD) time according to an embodiment of the disclosure.

FIG. 3 is a diagram illustrating an operation in which an electronic device (e.g., the electronic device 101 of FIG. 2) determines an End Point Detection (EPD) time according to an embodiment of the disclosure.

Referring to FIG. 3, the electronic device 101 may include any one of an ASR module 221, an EPD determination module 110, a sentence type determination module 111, and utterance data 112, and a speech section detection module 116, as shown in FIG. 3.

For example, the utterance data 112 includes at least one of sentence data 113, word data 114, and an EPD command 115. For example, the electronic device 101 generates the utterance data 112 according to a sentence and a word generated based on an utterance 195, which is input. For example, the electronic device 101 generates the utterance data 112 according to the generated sentence or word, based on a user's input. The electronic device 101 may store the utterance data 112, which is generated, in a memory (e.g., the memory 130 of FIG. 2).

For example, the sentence data 113 includes a sentence generated according to the utterance 195. For example, the word data 114 includes a word generated according to the utterance 195. For example, the EPD command 115 includes at least one of a word or a sentence generated according to the user's input.

For example, the utterance data 112 is generated according to at least one of the utterance 195 or the user's input and may be generated according to the user's utterance history.

For example, the ASR module 221 may generates text, using the utterance 195. The electronic device 101 may generate the utterance data 112, using the text generated by the ASR module 221.

For example, the electronic device 101 generates the utterance data 112, using final text generated by the ASR module 221. For example, the final text indicates text generated after recognizing that the utterance 195 is completed.

According to an embodiment, the speech section detection module 116 may detect a speech section (e.g., a speech mode) and a non-speech section (e.g., a non-speech mode), using the utterance 195, which is input. For example, the utterance 195 refers to an audio signal input to the electronic device 101.

For example, the speech section detection module 116 includes at least one of a speech section determination module 117 and a speech-based model 118. For example, the speech section detection module 116 inputs the utterance 195, which is input, to the speech section determination module 117.

For example, the speech section determination module 117 inputs the utterance 195 (e.g., an audio signal), which is input, to the speech-based model 118. The speech-based model 118 may distinguish the speech section from the non-speech section, using the utterance 195, which is input.

For example, the speech-based model 118 transmits voice activity detection (VAD) to the speech section determination module 117, depending on whether a speech is detected in the utterance 195, which is input.

For example, the speech-based model 118 transmits VAD of 1 to the speech section determination module 117 during a time when a speech is detected. For example, the speech-based model 118 transmits VAD of 0 to the speech section determination module 117 during a time when no speech is detected.

For example, the speech section determination module 117 determines the speech section or non-speech section based on the VAD. For example, with respect to a section of VAD of 1, the speech section determination module 117 determines the section to be the speech section. For example, with respect to a section of VAD of 0, the speech section determination module 117 determines the section to be the non-speech section.

For example, the speech section determination module 117 transmits EPD to the EPD determination module 110 according to a result of detecting speech. For example, during a time when a speech is detected, the speech section determination module 117 transmits EPD of 1 to the EPD determination module 110. For example, during a time when no speech is detected, the speech section determination module 117 may transmit EPD of 0 to the EPD determination module 110.

As an example, the EPD determination module 110 determines an EPD time for terminating recognition of the utterance 195. For example, with respect to EPD, the EPD time refers to a hangover time to determine whether the utterance 195 is completed. For example, when the non-speech section lasts longer than the EPD time or the hangover time, the electronic device 101 determines that the utterance 195 is completed. For example, when the utterance 195 is completed, the electronic device 101 terminates recognition of the utterance 195.

For example, the EPD determination module 110 determines an EPD time based on the utterance data 112 or a sentence type. For example, the EPD determination module 110 determines the EPD time, using the utterance data 112. For example, the EPD determination module 110 uses the sentence type to determine the EPD time.

In another embodiment, the EPD determination module 110 receives text from the ASR module 221. For example, the EPD determination module 110 receives partial text from the ASR module 221. For example, the partial text is some of text corresponding to the utterance 195 generated by the ASR module 221. For example, the EPD determination module 110 uses the utterance data 112 and the text or the partial text to determine whether a pattern of the utterance 195 is substantially the same as a pattern stored in the utterance data 112. For example, the EPD determination module 110 uses the utterance data 112 and the text or the partial text to determine whether the pattern of the utterance 195 is similar to the pattern stored in the utterance data 112.

For example, when the pattern of the utterance 195 is substantially the same as the pattern stored in the utterance data 112, the EPD determination module 110 determines the EPD time according to the pattern. For example, an initially set EPD time may be about 600 ms. For example, when the pattern of the utterance 195 is substantially the same as the pattern stored in the utterance data 112, the EPD determination module 110 determines the EPD time to be the EPD time of a length, such as about 100 ms or about 2,000 ms, according to the pattern.

For example, when the user's utterance intent is utterance end intent, the EPD determination module 110 determines the EPD time to be about 100 ms. For example, when the user's utterance intent is subsequent utterance intent, the EPD determination module 110 determines the EPD time to be approximately 2,000 ms. For example, when the pattern of the utterance 195 is a pattern of terminating recognition of the utterance 195 early, the EPD determination module 110 determines the EPD time to be an EPD time (e.g., about 100 ms) that is faster than the initially set EPD time (e.g., about 600 ms).

For example, when the pattern of the utterance 195 is a pattern of inputting a subsequent utterance after the utterance 195, the EPD determination module 110 determines the EPD time to be an EPD time (e.g., about 2,000 ms) that is slower than the initially set EPD time (e.g., about 600 ms).

In the example described above, the initially set EPD time of about 600 ms and the EPD times of about 100 ms and 2,000 ms determined by the EPD determination module 110 are examples and are not limited thereto. For example, the initially set EPD time may be about 900 ms. For example, the EPD determination module 110 determines the EPD time to be about 50 ms, about 150 ms, about 200 ms, about 1,500 ms, about 2,500 ms, and the like according to the user's utterance intent. For example, the EPD determination module 110 determines the EPD time to be faster than the initially set EPD time or to be slower than the initially set EPD time, according to the user's utterance intent.

As described above, when the utterance 195 substantially matches a specific pattern, the electronic device 101 determines the EPD time to be faster than the initially set EPD time, considering the user's intent to terminate the utterance 195 for speech recognition. The electronic device 101 shortens a waiting time for speech recognition and improve user convenience through the fast EPD time.

The electronic device 101 may terminate recognition of the utterance 195 when the utterance 195 is not newly input within the fast EPD time.

For example, terminating the recognition of the utterance 195 refers to the ASR module 221 terminating the recognition of the utterance 195 to be additionally input. For example, when the recognition of the utterance 195 is completed, the electronic device 101 uses text generated by the ASR module 221 to perform an operation according to the user's intent.

For example, when the utterance 195 is newly recognized after a long waiting time following a pattern, the EPD determination module 110 determines the EPD time to be an EPD time (e.g., 1,000 ms or about 2,000 ms) that is slower than the initially set EPD time (e.g., about 600 ms).

In the case of the pattern in which the utterance 195 is additionally input after a long waiting time, the electronic device 101 determines the EPD time to be slower than the initially set EPD time, considering the user's intent. The electronic device 101 receives a subsequent utterance of the user, considering the user's intent not to end the utterance 195 when a specific pattern is input through the slow EPD time.

For example, when a pattern of the utterance 195 is similar to a pattern stored in the utterance data 112, the EPD determination module 110 determines the EPD time according to the pattern. For example, the initially set EPD time is about 600 ms. For example, when the pattern of the utterance 195 is similar to the pattern stored in the utterance data 112, the EPD determination module 110 determines the EPD time according to the pattern. For example, when the user's utterance intent is to end the utterance 195, the EPD determination module 110 determines the EPD time to be about 100 ms. For example, when the user's utterance intent of the pattern is subsequent utterance intent, the EPD determination module 110 determines the EPD time to be about 2,000 ms.

When the pattern of the utterance 195 is similar to the pattern stored in the utterance data 112, the EPD determination module 110 may determine the EPD time of the pattern of the utterance 195 to be the same as the EPD time of the pattern stored in the utterance data 112.

For example, the EPD determination module 110 determines whether the pattern of the utterance 195 is substantially the same as or similar to the stored pattern, based on at least one of the sentence data 113 and the word data 114 stored in the utterance data 112. For example, the EPD determination module 110 compares text received from the ASR module 221 to a sentence stored in the sentence data 113. For example, the EPD determination module 110 compares the pattern of the utterance 195 to the stored pattern by comparing the sentence data 113 to the sentence type, composition, and word of the text. For example, the EPD determination module 110 compares the word data 114 to the word in the text to compare the pattern of the utterance 195 to the stored pattern.

As an example, the EPD determination module 110 transmits the text to the sentence type determination module 111. For example, the EPD determination module 110 transmits partial text to the sentence type determination module 111. For example, the EPD determination module 110 receives a sentence type corresponding to the partial text from the sentence type determination module 111, in response to the partial text.

For example, the sentence type includes an incomplete sentence type, a complete sentence type, and an ambiguous sentence type. For example, the incomplete sentence type refers to a sentence in which a sentence is not completed. For example, the incomplete sentence type refers to an incomplete sentence, such as "I eat", "tomorrow's weather", "singer A's song", and "tomorrow's schedule".

For example, the complete sentence type refers to a sentence in which a sentence is completely finished. For example, the complete sentence type refers to a complete sentence, such as "Tell me the weather tomorrow.", "Tell me tomorrow's schedule.", "Play singer A's song.", and the like.

For example, the ambiguous sentence type refers to a sentence type that does not belong to either the incomplete sentence type or the complete sentence type.

For example, the electronic device 101 classifies or determines the sentence type of the utterance 195. For example, the sentence type determination module 111 determines the sentence type of received text.

For example, the sentence type determination module 111 determines the sentence type, considering language grammar and/or a special purpose (e.g., usability of an incomplete sentence) or constraints with respect to the received text.

For example, the sentence type determination module 111 determines the sentence type of text, considering the purpose of the text. For example, text, such as "today's weather", "10 o'clock alarm", and "mom call" corresponds to the incomplete sentence type in which a sentence does not completely end according to language grammar. Text, such as "today's weather", "10 o'clock alarm", and "mom call", may correspond to the incomplete sentence type according to language grammar, but the sentence type determination module 111 may consider the purpose of the text and classify, into the complete sentence type, the text of the incomplete sentence type having usability, such as "today's weather", "10 o'clock alarm", and "mom call". For example, the text of the incomplete sentence type having usability corresponds to the incomplete sentence according to language grammar but may refer to text based on which the user's intent and an operation according to a command may be determined.

For example, the sentence type determination module 111 may determine an inverted sentence to be the complete sentence. For example, the sentence "a message to my older sister" is classified as an incomplete sentence in terms of language grammar, but the sentence type determination module 111 determines the sentence to be a complete sentence.

For example, the sentence type determination module 111 determines a sentence type of text, considering a constraint situation (e.g., ambiguity of language grammar). For example, in the case of text that may be classified into a complete sentence type or an incomplete sentence type according to interpretation, such as "tomorrow's weather", the sentence type determination module 111 considers the constraint situation and thus determine the text to be an ambiguous sentence type.

For example, the sentence type determination module 111 determines text to be an ambiguous sentence type in the case of inability to determine the grammar type of the text, such as text having a typo or misprint or text of a one-letter token. For example, when the ASR module 221 receives text including a typo or a grammatical error, when a short sentence makes it difficult to determine whether the sentence is a complete sentence or an incomplete sentence, or when a sentence is an ambiguous sentence, the sentence type determination module 111 determines such sentences to be an ambiguous sentence type. For example, the sentence type determination module 111 determines the sentence type of the utterance 195, using the text and the utterance data 112 received from the EPD determination module 110. For example, the sentence type determination module 111 determines the sentence type of the utterance 195, using at least one of a sentence pattern and a word stored in the utterance data 112.

For example, the EPD determination module 110 determines the EPD time according to the sentence type. For example, when the sentence type is a complete sentence, the EPD determination module 110 determines the EPD time to be an EPD time (e.g., about 300 ms) that is faster than an initially set EPD time (e.g., about 600 ms).

For example, when the sentence type is an incomplete sentence, the EPD determination module 110 determines the EPD time to be an EPD time (e.g., about 1,000 ms) that is slower than the initially set EPD time (e.g., about 600 ms).

For example, when the sentence type is an ambiguous sentence type, the EPD determination module 110 determines the EPD time to be the initially set EPD time (e.g., about 600 ms).

The electronic device 101 determines the EPD time, considering the user's intent to additionally input the utterance 195, according to the sentence type of the utterance 195.

For example, the EPD determination module 110 causes the ASR module 221 to terminate recognition of the utterance 195, according to the EPD time. For example, when a speech section is not detected within the determined EPD time, the EPD determination module 110 causes the ASR module 221 to terminate recognition of the utterance 195. For example, when the recognition of the utterance 195 is terminated, the ASR module 221 transfers text of the utterance 195, which is recognized, an a NLU module (e.g., the NLU module 223 of FIG. 2).

For example, the ASR module 221 terminates recognition of the utterance 195 when a speech section is not detected within the determined EPD time. For example, the ASR module 221 receives a result of detecting a speech section or a non-speech section from the speech section detection module 116.

FIG. 3 is a diagram illustrating an operation in which the electronic device 101 according to an embodiment determines the EPD time, using the ASR module 221, the EPD determination module 110, the sentence type determination module 111, the utterance data 112, and the speech section detection module 116.

According to an embodiment, the processor 120 of the electronic device 101 may perform the operation of at least one of the ASR module 221, the EPD determination module 110, the sentence type determination module 111, and the speech section detection module 116, as shown in FIG. 3. For example, the operation of each component shown in FIG. 3 (e.g., the ASR module 221, the EPD determination module 110, the sentence type determination module 111, and the speech section detection module 116) is performed by a processor (e.g., the processor 120 of FIG. 2) of the electronic device 101.

In FIG. 3, the utterance data 112 may refer to a user's individual utterance history. The electronic device 101 may determine an EPD time suitable for an individual user by determining the EPD time according to the user's individual utterance history. The electronic device 101 may determine the EPD time according to the user's utterance history, to terminate recognition of the utterance 195 early or delay the termination of recognition of the utterance 195 and may recognize the user's speech according to the user's intent.

For example, the utterance data 112 is initially set by using standardized data including utterance history of a plurality of users. For example, the utterance history of the plurality of users is classified according to information of the individual users, such as a residence area, gender, language, and age of the plurality of users. For example, the utterance data 112 is set by using a user's information of the electronic device 101. For example, the electronic device 101 is initially set the utterance data 112 by using utterance history corresponding to the user's information in standardized data.

For example, the electronic device 101 updates the utterance data 112, using the user's utterance history in the utterance data 112 initially set based on the standardized data, or may replace the utterance data 112 according to the user's utterance history.

Figure 4:
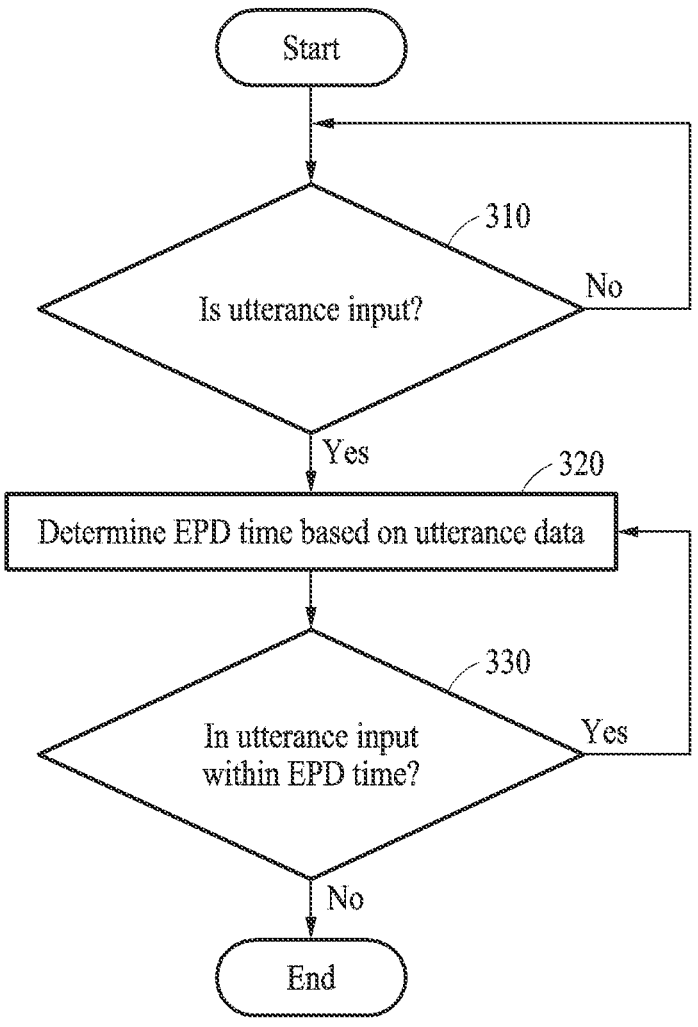
FIG. 4 is a flowchart illustrating an operating method of an electronic device to determine an EPD time according to an embodiment of the disclosure.

FIG. 4 is a flowchart illustrating an operating method of an electronic device (e.g., the electronic device 101 of FIG. 2) to determine an EPD time according to an embodiment of the disclosure.

In the following example, operations is performed sequentially, but not necessarily sequentially. For example, the order of the operations is changed and at least two of the operations are performed in parallel.

According to an embodiment, operations 310 to 330 may be performed by a processor (e.g., the processor 120 of FIG. 2) of an electronic device (e.g., the electronic device 101 of FIG. 2).

Referring to FIG. 4, in operation 310, the electronic device 101 according to another embodiment may identify whether an utterance (e.g., the utterance 195 of FIG. 3) is input. For example, a processor (e.g., the processor 120 of FIG. 2) of the electronic device 101 uses an ASR module (e.g., the ASR module 221 of FIGS. 2 and 3) to determine whether the utterance 195 is input.

In operation 320, the electronic device 101 according to yet another embodiment may determine an EPD time based on utterance data (e.g., the utterance data 112 of FIG. 3). In an example, the EPD time refers to a time to detect an end point.

For example, in operation 320, the electronic device 101 determines the EPD time based on at least one of whether a pattern of the utterance 195 is substantially the same as a pattern stored in the utterance data 112 and whether the pattern of the utterance 195 is similar to the pattern stored in the utterance data 112.

For example, in operation 320, the electronic device 101 determines the EPD time according to a sentence type of the utterance 195. The sentence type may include a complete sentence type, an incomplete sentence type, or an ambiguous sentence type.

In operation 330, the electronic device 101 according to yet another embodiment may determine whether the utterance 195 is input within the EPD time. For example, when the utterance 195 is newly input within the determined EPD time, a new EPD time is determined according to operation 320. For example, when the utterance 195 is not input within the determined EPD time, the electronic device 101 terminates recognition of the utterance 195. For example, when the recognition of the utterance 195 is terminated, the electronic device 101 performs an operation according to intent included in the utterance 195, using text corresponding to the utterance 195, which is input.

Figure 5:
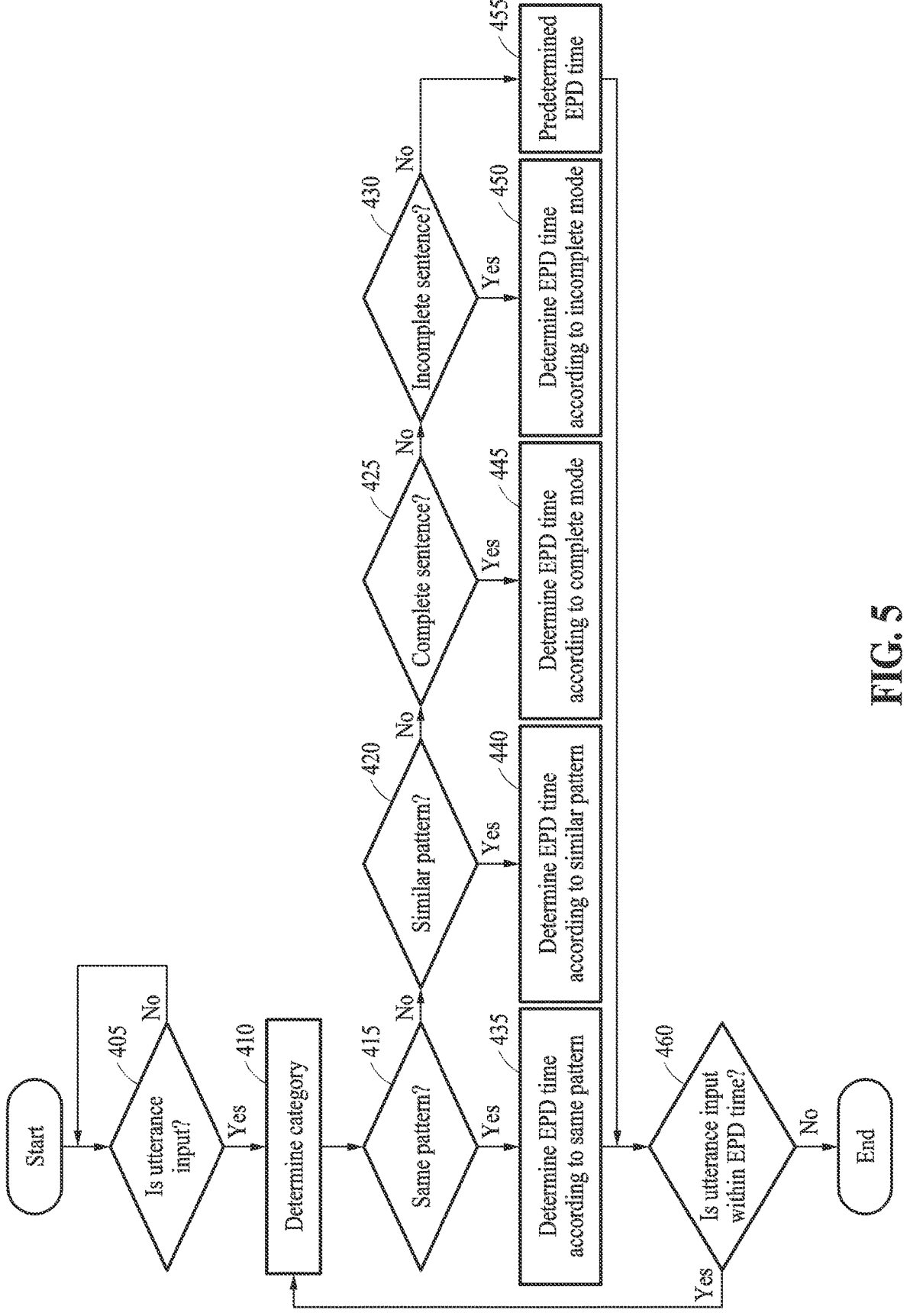
FIG. 5 is a flowchart illustrating an operating method of an electronic device to determine an EPD time according to an embodiment of the disclosure.

FIG. 5 is a flowchart illustrating an operating method of an electronic device (e.g., the electronic device 101 of FIG. 2) to determine an EPD time according to an embodiment of the disclosure.

In the following example, operations may be performed sequentially, but not necessarily sequentially. For example, the order of the operations may be changed and at least two of the operations may be performed in parallel.

According to an embodiment, operations 405 to 460 may be performed by a processor (e.g., the processor 120 of FIG. 2) of an electronic device (e.g., the electronic device 101 of FIG. 2).

Referring to FIG. 5, in operation 405, the electronic device 101 according to another embodiment may identify whether an utterance 195 is input. The description of operation 310 of FIG. 4 may apply to operation 405 substantially in the same manner.

In operation 410, the electronic device 101 may determine a category of the utterance 195. For example, a processor (e.g., the processor 120 of FIG. 2) of the electronic device 101 determines a category of the utterance 195 by using a K-means algorithm. The K-means algorithm may group given data pieces into k number clusters and may operate in a manner of minimizing the variance of differences in a distance to each cluster. For example, the processor 120 of the electronic device 101 determines a category corresponding to an utterance (e.g., the utterance 195 of FIG. 3) from among a plurality of clustered categories.

In order to determine a category of the utterance 195, the electronic device 101 may cluster the plurality of categories, using a known algorithm (e.g., Mean Shift, a Gaussian Mixture Model, Density-based spatial clustering of applications with noise (DBSCAN), Agglomerative Clustering, and the like) that is different from the example described above and may determine a category corresponding to the utterance 195.

In operation 415, the electronic device 101 may determine whether a pattern of the utterance 195 is substantially the same as a pattern stored in utterance data (e.g., the utterance data 112 of FIG. 3).

In operation 420, the electronic device 101 may determine whether the pattern of the utterance 195 is similar to the pattern stored in the utterance data 112.

For example, the electronic device 101 compares a sentence corresponding to the utterance 195 and a word included in the utterance 195 to sentence data (e.g., the sentence data 113 of FIG. 3) and/or word data (e.g., the word data 114 of FIG. 3) and thus determine similarity. For example, the electronic device 101 determines the similarity based on a similarity model. For example, the similarity model refers to a pretrained and tuned model. For example, the similarity model uses an input sentence to determine whether the input sentence is similar to a stored sentence or word.

For example, in operations 415 and 420, the electronic device 101 compares text corresponding to the utterance 195 to a sentence stored in the sentence data 113. For example, the electronic device 101 determines whether a sentence pattern of the text is substantially the same as a sentence pattern stored in sentence data 113. For example, the electronic device 101 determines whether the sentence pattern of the text is similar to the sentence pattern stored in the sentence data 113.

For example, in operations 415 and 420, the electronic device 101 uses various well-known algorithms to determine whether the pattern of the utterance 195 is substantially the same as or similar to the pattern stored in the utterance data 112 or to determine the similarity of sentences.

According to yet another embodiment, in operation 425, the electronic device 101 determines whether the sentence type of the utterance 195 is a complete sentence type.

According to yet another embodiment, in operation 430, the electronic device 101 determines whether the sentence type of the utterance 195 is an incomplete sentence type.

For example, in operations 425 and 430, the electronic device 101 determines the sentence type of the utterance 195 according to the type of a last word in the utterance 195. For example, each word included in the word data 114 is determined to be one of a clear complete sentence type, a complete sentence type, a clear incomplete sentence type, an incomplete sentence type, and an ambiguous sentence type, according to a user's utterance history.

For example, when the utterance 195, in which no speech is additionally input after a word A, is repeatedly input, the electronic device 101 determines the word A to be the complete sentence type. For example, when the utterance 195, in which no speech is additionally input after the word A, is input by as much as a specified threshold value or more, the electronic device 101 may determine the word A to be the clear complete sentence type.

For example, when the utterance 195, in which a speech is additionally input after a word B, is repeatedly input, the electronic device 101 determines the word B to be the incomplete sentence type. For example, when the utterance 195, in which a speech is additionally input after the word B, is input by as much as the specified threshold or more, the electronic device 101 sets the word B as the clear incomplete sentence type.

For example, when the utterance 195, in which a speech is additionally input after a word C, and the utterance 195, in which no speech is additionally input after the word C, are input, the electronic device 101 sets the word C as the ambiguous sentence type.

In the example described above, the electronic device 101 sets a sentence type for each word by comparing a threshold value to the number of additional inputs of the utterance 195 after each word. The sentence type set for each word may be set according to a user's utterance pattern. For example, since no utterance is additionally input after inputting the word A according to the user's utterance pattern in the example described above, the electronic device 101 sets the type of word A as the clear complete sentence type.

For example, the electronic device 101 determines the sentence type of the utterance 195 according to a sentence type corresponding to a last piece of text of the utterance 195.

For example, in operations 425 and 430, when the sentence type of the utterance 195 does not correspond to a complete sentence or an incomplete sentence, the electronic device 101 determines the sentence type of the utterance 195 to be an ambiguous sentence.

A method in which the electronic device 101 determines the sentence type of the utterance 195 is not limited to the examples in operations 425 and 430 described above. For example, the electronic device 101 determines the user's intent to additionally input speech or the user's intent not to additionally input speech based on the utterance 195 corresponding the complete sentence or the utterance 195 corresponding to the incomplete sentence, through various known methods.

In operations 415, 420, 425, and 430 described above, the electronic device 101 may use the utterance data 112 corresponding to a category of the utterance 195. For example, in operation 415, when the category of the utterance 195 is A, the electronic device 101 may use the utterance data 112 corresponding to the category A in the utterance data 112 to determine whether a pattern of the utterance 195 is the same as a stored pattern.

For example, in operation 415, the electronic device 101 uses the sentence data 113 and/or the word data 114 corresponding to the category A of the utterance 195 to determine whether the pattern of the utterance 195 is substantially the same as the stored pattern.

Substantially the same as the example described above, in at least one of operations 420, 425, and 430, the electronic device 101 may perform an operation by using the utterance data 112 of substantially the same category as the utterance 195.

For example, in operations 435, 440, 445, 450, and 455 below, the length of an extremely fast EPD time corresponds to a first length, the length of a fast EPD time may correspond to a second length, the length of an initially set EPD time corresponds to a third length, the length of a slow EPD time corresponds to a fourth length, and the length of an extremely slow EPD time corresponds to a fifth length. For example, the length of each of the EPD times is determined to be (the first length)<(the second length)<(the third length) <(the fourth length)<(the fifth length).

In operation 435, the electronic device 101 determines an EPD time according to a matching pattern. For example, the electronic device 101 determines the EPD time according to the matching pattern, in operation 435.

For example, the electronic device 101 determines the EPD time, considering the user's utterance intent. For example, when a pattern of the utterance 195 substantially matches a pattern stored in the utterance data 112 and the user's utterance intent of the pattern is utterance end intent, the electronic device 101 determines an EPD time (e.g., the EPD time of the first length) that is faster than an initially set EPD time.

For example, when the pattern of the utterance 195 substantially matches the pattern stored in the utterance data 112 and the user's utterance intent of the pattern is utterance end intent, it refers to completion of the utterance 195. When the pattern of the utterance 195 substantially matches the pattern stored in the utterance data 112 and the user's utterance intent of the pattern is utterance end intent, the electronic device 101 may determine that the utterance 195 is completed and determine the EPD time to be the EPD time of the first length, which is fastest among set EPD times.

For example, when the pattern of the utterance 195 matches the pattern stored in the utterance data 112 and the user's utterance intent of the pattern is subsequent utterance intent, the electronic device 101 determines the EPD time to be an EPD time (e.g., the EPD time of the fifth length) that is slower than the initially set EPD time. For example, when the user's utterance intent of a pattern is subsequent utterance intent, the user delays the end of the utterance 195, so that the utterance 195 may not end for a long time. When a pattern of the utterance 195 matches a specific pattern stored in the utterance data 112 and the user's utterance intent of the pattern is subsequent utterance intent, the electronic device 101 may determine that the utterance 195 is not completed and then determine the EPD time of the fifth length, which is slowest among a plurality of the set EPD times. For example, the specific pattern corresponding to the EPD time of the fifth length is determined by the user's input. For example, the specific pattern corresponding to the extremely slow EPD time is determined according to the user's utterance history.

According to yet another embodiment, in operation 440, the electronic device 101 may determine the EPD time according to a similar pattern. For example, the electronic device 101 determines the EPD time according to the similar pattern in operation 440.

For example, in operation 440, the electronic device 101 determines the EPD time to be an EPD time (e.g., the EPD of the fourth length or the fifth length) that is slower than the initially set EPD time or the EPD time (e.g., the EPD time of the first length or the second length) that is faster than the initially set EPD time, according to a similar pattern and/or the user's utterance intent of the similar pattern. The description of operation 435 may apply to operation 440 substantially in the same manner.

For example, when a pattern of the utterance 195 is similar to a pattern stored in the utterance data 112 and the user's utterance intent of the similar pattern is utterance end intent, the electronic device 101 determines that the utterance 195 is completed and determine the EPD time to be the EPD time of the second length that is faster than the initially set EPD time.

For example, when the pattern of the utterance 195 is similar to the pattern stored in the utterance data 112 and the user's utterance intent of the similar pattern is subsequent utterance intent, the electronic device 101 determines that the utterance 195 is not completed and thus determine the EPD time to be the EPD time of the third length that is slower than the initially set EPD time.

According to yet another embodiment, the electronic device 101 may set the EPD time corresponding to each sentence pattern. For example, the electronic device 101 sets the EPD times of the first length and the second length for a sentence pattern 1 and may set the EPD times of the fifth length and the fourth length for a sentence pattern 2.

For example, when a pattern of the utterance 195 is substantially the same as the sentence pattern 1 in operation 415, the electronic device 101 determines the EPD time to be the EPD time of the first length in operation 435. For example, when the pattern of the utterance 195 is similar to the sentence pattern 1 in operation 420, the electronic device 101 determines the EPD time to be the EPD time of the second length in operation 440.

For example, when a pattern of the utterance 195 is substantially the same as the sentence pattern 2 in operation 415, the electronic device 101 determines the EPD time to be the EPD time of the fifth length in operation 435. For example, when the pattern of the utterance 195 is similar to the sentence pattern 2 in operation 420, the electronic device 101 determines the EPD time to be the EPD time of the fourth length in operation 440.

In the example described above, the EPD time of the first length set for the sentence pattern 1 may correspond to the EPD time set for a user's utterance having a pattern that is substantially the same as the sentence pattern 1. For example, the EPD time of the second length set for the sentence pattern 1 corresponds to the EPD time set for a user's utterance having a pattern similar to the sentence pattern 1. The description given above may be equally applied to the EPD times of the fifth length and the fourth length set in the sentence pattern 2.

According yet another an embodiment, the electronic device 101 may determine the EPD time according to a complete mode in operation 445. For example, when the sentence type of the utterance 195 is a complete sentence type or a clear complete sentence type, the electronic device 101 determines the EPD time to be the EPD time (e.g., the first length or the second length) that is faster than the initially set EPD time.

According to yet another embodiment, in operation 450, the electronic device 101 may determine the EPD time according to an incomplete mode. For example, when the sentence type of the utterance 195 is an incomplete sentence type or a clear incomplete sentence type, the electronic device 101 determines the EPD time to be the EPD time (e.g., the fourth length or the fifth length) that is slower than the initially set EPD time.

According to yet another embodiment, the electronic device 101 may determine the EPD time according to a preset EPD time in operation 455. For example, when the sentence type of the utterance 195 is an ambiguous sentence type, the electronic device 101 determines the EPD time to be the initially set EPD time.

The classification of the first length to the fifth length is illustrative and not limited thereto. For example, the length of each EPD time may be classified into a first length to a third length, and the lengths is set as (the first length)>(the second length)>(the third length).

In FIGS. 4 and 5, the electronic device 101 may determine the EPD time, using the utterance data 112 generated based on the user's utterance history. The electronic device 101 may determine the EPD time based on the pattern of the utterance 195, which is frequently input by the user, considering the user's utterance end intent or the user's subsequent utterance intent and may detect the end point of the utterance 195.

For example, when the user ends the utterance 195, the electronic device 101 determines the EPD time to be faster or slower than the initially set time and terminates recognition of the utterance 195 early to perform an operation, according the utterance 195, which is input.

FIGS. 4 and 5 may be examples of operations performed by the electronic device 101 to determine the EPD time. However, the order of operations is not limited thereto and some of operations may be omitted.

Figures 6, 7:
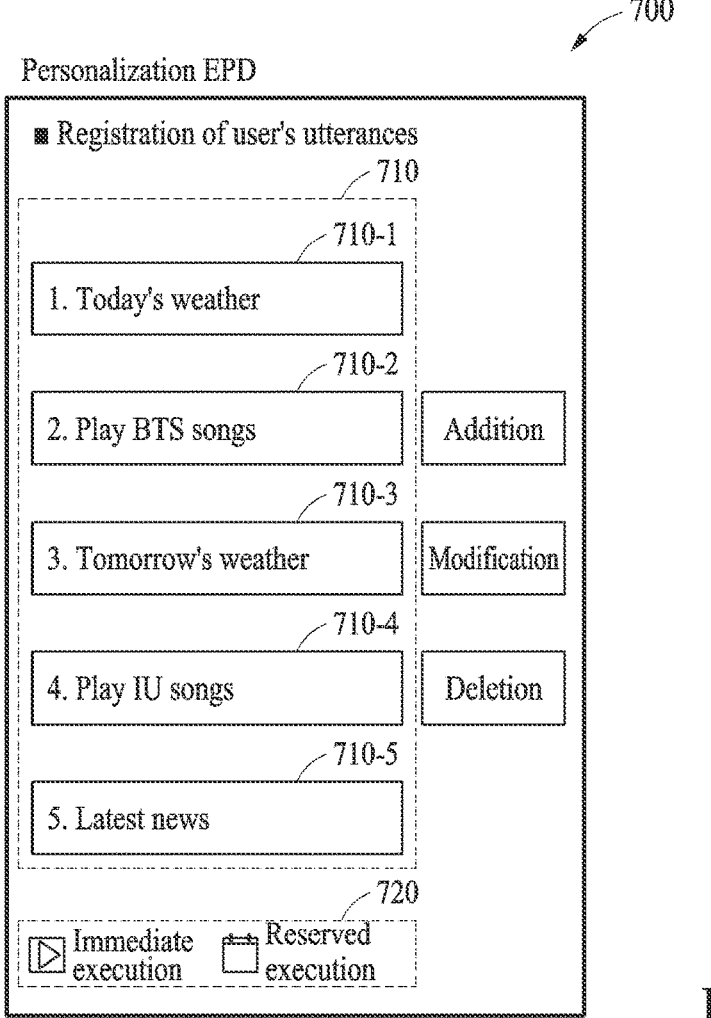
FIG. 6 is a diagram illustrating utterance data according to an embodiment of the disclosure.
FIG. 7 is a diagram illustrating a user interface for registering an utterance in utterance data, according to an embodiment of the disclosure.

FIG. 6 is a diagram illustrating utterance data (e.g., the utterance data 112 of FIG. 3) according to an embodiment of the disclosure.

In an example, an electronic device (e.g., the electronic device 101 of FIG. 2) may generate the utterance data 112 as shown in FIG. 6 by using a user's utterance history, which is previously input. For example, the electronic device 101 generates the utterance data 112 according to a count 510 of inputs of an utterance (e.g., the utterance 195 of FIG. 3) that is previously input, an input date 520, a category 530 of an utterance, and a count 540 of inputs of a category. For example, the count 510 of inputs of the utterance refers to how many times the utterance 195, which is applicable, is input and the count 540 of inputs of the category may refer to how many times an applicable category is input. For example, referring to FIG. 6, a music category 530-1 is input 33 times, a weather category 530-2 may be input 20 times, and a call category 530-3 may be input 10 times.

For example, the input date 520 indicates a date on which the utterance 195, which is applicable, is input or a last date on which the utterance 195, which is applicable, is input.

FIG. 7 is a diagram illustrating a user interface for registering an utterance (e.g., the utterance 195 of FIG. 3) in utterance data (e.g., the utterance data 112 of FIG. 3), according to an embodiment of the disclosure.

In an example, an electronic device (e.g., the electronic device 101 of FIG. 2) may provide a user interface for registering the utterance 195 as shown in FIG. 7. For example, the electronic device 101 includes a display module (e.g., the display module 160 of FIG. 2) and provide a user interface 700 as shown in FIG. 7, using the display module 160.

For example, the electronic device 101 generates utterance data 112 based on a user's input. For example, referring to FIG. 7, sentences, such as "today's weather" 710-1, "Play BTS songs." 710-2, "tomorrow's weather" 710-3, "Play IU songs." 710-4, and "latest news" 710-5, may be input by using a user utterance registration interface 710. The electronic device 101 may generate the utterance data 112 by registering, as the utterances 195, the sentences 710-1 to 710-5 illustrated as registration items of the utterance 195 in FIG. 7. For example, the electronic device 101 generates the utterance data 112 as shown in FIG. 6, using the utterances 195, which are registered.

In an example of the display module 160, the electronic device 101 may update the utterance data 112 according to a preset update criterion. For example, the update criterion includes criteria, such as a certain period of time and a count of utterances 195, which are newly input. For example, the electronic device 101 may store the utterance 195, which is input, in a storage space (e.g., the memory 130 of FIG. 2). When the count of utterances newly stored is greater than a set count or every predetermined period, the electronic device 101 may process the utterances 195, which are stored, and update the utterance data 112.

For example, the electronic device 101 may display, on the display module 160, a display object 720 for setting a user's input, such as "immediate execution" or "reserved execution", as shown in FIG. 7. The electronic device 101 updates the utterance data 112 based on the user's input for settings, such as "immediate execution" and "reserved execution". For example, upon receiving an "immediate execution" input from the user, the electronic device 101 processes the utterance 195 stored in the storage space and update the utterance data 112. For example, upon receiving a "reserved execution" input from the user, the electronic device 101 updates the utterance data 112 by processing the utterance 195 stored in the storage space at a set time.

Figure 8:
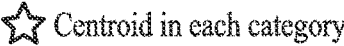
FIG. 8 is a diagram illustrating categories of utterances according to an embodiment of the disclosure.
Figure 8:
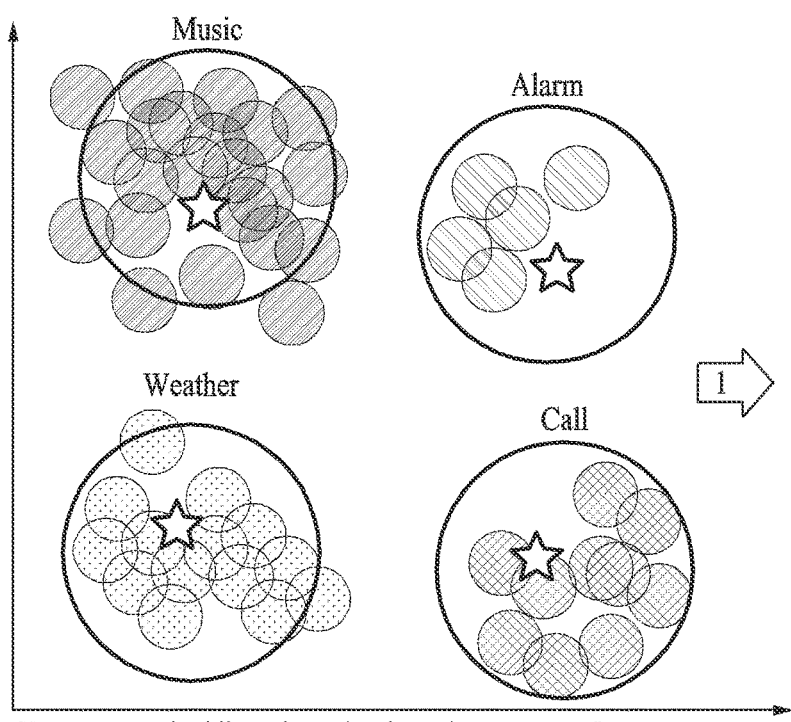

FIG. 8 is a diagram illustrating categories of utterances according to an embodiment of the disclosure.

For example, an electronic device (e.g., the electronic device 101 of FIG. 2) may perform clustering into a plurality of categories by using utterances (e.g., the utterances 195 of FIG. 3), which are previously input. For example, referring to FIG. 8, the electronic device 101 may cluster the categories of the utterances 195, which are pre-input, into a plurality of categories, such as music, weather, alarm, and call.

For example, the electronic device 101 determines a category of an input user's utterance. For example, the electronic device 101 determines the category of the utterance 195 of "Play song A.", which is a newly input, to be music among the categories, as shown in FIG. 8.

For example, the categories of utterances shown in FIG. 8 represents categories of utterances clustered by the electronic device 101 based on a K-means algorithm, according to an embodiment. For example, the electronic device 101 randomly generates a certain K number of centroids and include each point in a cluster of a closest centroid. The electronic device 101 may calculate a new centroid, using the average of points included in each cluster.

For example, the electronic device 101 performs sentence embedding clustering, using the K-means algorithm. For example, the electronic device 101 may include a sentence embedding clustering module.

For example, K number of centroids are initially generated according to a certain number (e.g., K) of utterance categories. When more utterances than a set number are stored in utterance data (e.g., the utterance data 112 of FIG. 2), the electronic device 101 may update utterance categories, using the sentence embedding clustering module. For example, the electronic device 101 includes points according to the utterance data 112, which is stored, in a cluster of a closest centroid and may update the centroid of each cluster. For example, the electronic device 101 expresses a sentence corresponding to the utterance data 112 as a vector, using a pre-trained sentence embedding vector table. The electronic device 101 may sort the utterance categories of the utterance data 112, using various methods other than the K-means algorithm described above, and the utterance categories are not limited to those shown in FIG. 8.

Figure 9:
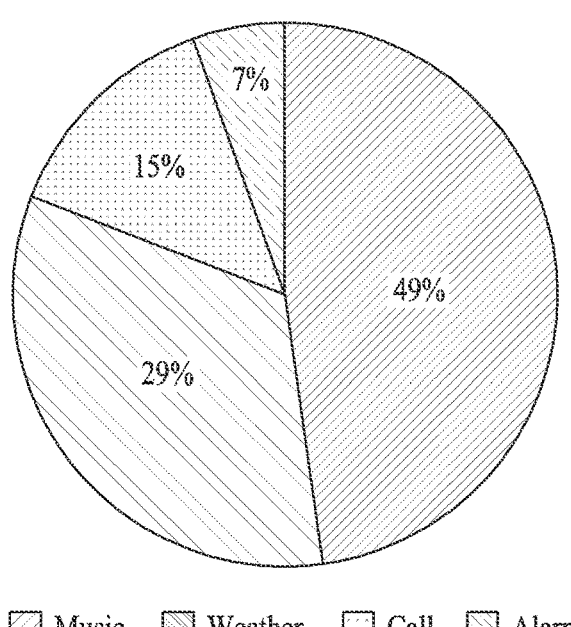
FIG. 9 is a diagram illustrating category proportions of utterances, according to an embodiment of the disclosure.

FIG. 9 is a diagram illustrating category proportions of utterances, according to an embodiment of the disclosure.

For example, an electronic device (e.g., the electronic device 101 of FIG. 2) may cluster utterances (e.g., the utterances 195 of FIG. 3) that are previously input, as shown in FIG. 8, and the proportion of each category may be expressed as shown in FIG. 9. For example, referring to FIG. 9, the proportion of a music category (e.g., the music of FIG. 9) is about 49%, the proportion of a call category (Call in FIG. 9? FIG. 9) is about 29%, and the proportion of a weather category (Weather in FIG. 9) is about 15%, and the proportion of an alarm category (e.g., Alarm in FIG. 9) is about 7%.

For example, the electronic device 101 determines a category of a user's utterance based on the proportion of the category. For example, as a result of clustering the utterances 195, which are newly input, in FIG. 8, when a distance to the centroid of the music category is the same as a distance to the centroid of the alarm category, the electronic device 101 determines a category of the utterance 195 by applying a weight according to the proportion of each category as shown in FIG. 9. For example, the electronic device 101 determines the category of the utterance 195 by assigning a greater weight to a category with a greater proportion.

For example, in the category proportions as shown in FIG. 9, as a result of clustering the utterances 195, when a distance to the centroid of the music category is the same as a distance to the centroid of the alarm category, the electronic device 101 determines the category of the utterance 195 to be the music category since the proportion of the music category (about 49%) is greater than the proportion of the alarm category (about 7%).

FIG. 10 is a diagram illustrating sentence data (e.g., the sentence data 113 of FIG. 3) according to an embodiment of the disclosure.

Referring to FIG. 10, an electronic device (e.g., the electronic device 101 of FIG. 2) according to an embodiment may generate sentence data 113 based on utterance data (e.g., the utterance data 112 of FIG. 3). For example, the electronic device 101 generates the sentence data 113 as shown in FIG. 10, using the utterance data 112 illustrated in FIG. 6. For example, pieces of the sentence data 113 is classified according to an utterance, a count of utterances, and categories.

FIG. 11 is a diagram illustrating word data (e.g., the word data 114 of FIG. 3) according to an embodiment of the disclosure.

Referring to FIG. 11, an electronic device (e.g., the electronic device 101 of FIG. 2) according to an embodiment may generate word data 114 based on utterance data (e.g., the utterance data 112 of FIG. 3). For example, the electronic device 101 generates the word data 114 as shown in FIG. 11, using the utterance data 112 shown in FIG. 6. For example, pieces of the word data 114 is classified according to utterances, a count of utterances, categories, and types.

For example, a type corresponding to a word is set as complete, clear complete, incomplete, clear incomplete, or ambiguous.

For example, the electronic device 101 determines the sentence type of an utterance (e.g., the utterance 195 of FIG. 3), using a last piece of text corresponding to the utterance 195 and the word data 114. For example, text corresponding to the utterance 195 is generated by the ASR module 221 according to the utterance 195.

For example, when the type of a word corresponding to the last piece of text is complete, the electronic device 101 determines the sentence type of the utterance 195 to be a complete sentence. For example, when the type of a word corresponding to the last piece of text is clear complete, the electronic device 101 determines the sentence type of the utterance 195 to be a clear complete sentence.

For example, when the type of a word corresponding to the last piece of text is incomplete, the electronic device 101 determines the sentence type of the utterance 195 to be an incomplete sentence. For example, when the type of a word corresponding to the last piece of text is clear incomplete, the electronic device 101 determines the sentence type of the utterance 195 to be a clear incomplete sentence.

For example, when the type of a word corresponding to the last piece of text is ambiguous, the electronic device 101 determines the sentence type of the utterance 195 to be an ambiguous sentence. For example, the electronic device 101 determines an EPD time according to the sentence type of the utterance 195. For example, when the sentence type of the utterance 195 is a clear complete sentence, a complete sentence, an incomplete sentence, or a clear incomplete sentence, the electronic device 101 determines an EPD time to be an extremely fast EPD time (e.g., about 100 ms), a fast EPD time (e.g., about 300 ms), a slow EPD time (e.g., about 800 ms), or an extremely slow EPD time (e.g., about 1,000 ms).

For example, the electronic device 101 determines the type of a word, using the utterance data 112. For example, when the utterance 195, which is different than a previous one, is always input after a word A, the electronic device 101 determines the type of the word A to be clear incomplete. For example, when the utterance 195, which is different, is not always input after a word B, the electronic device 101 determines the type of the word B to be clear complete.

For example, the electronic device 101 determines the type of a word C according to how frequently the utterance 195, which is different, is input after the word C. For example, the electronic device 101 determines the type of the word C by comparing a ratio where the utterance 195, which is different, is input after the word C to a ratio where the utterance 195, which is not different, is input after the word C.

For example, the type of the word C is determined to be at least one of clear complete, complete, incomplete, clear incomplete, and ambiguous by using a plurality of preset ratios and by using the ratio where the utterance 195, which is different, is input after the word C and the ratio where the utterance 195, which is not different, is input after the word C.

For example, referring to FIGS. 6 to 11, the electronic device 101 determines whether a pattern of the utterance 195 is substantially the same as a pattern stored in the utterance data 112. When the pattern of the utterance 195 is substantially the same as the pattern stored in the utterance data 112, the electronic device 101 may determine the EPD time according to the pattern.

For example, when the utterance 195 of "Play singer A's song." is input, the electronic device 101 determines a category of the utterance 195 to be "music", as shown in FIG. 8.

For example, the electronic device 101 uses the utterance 195 of "Play singer A's song" and the sentence data 113 of the "music" category of FIG. 10 to compare the pattern of the utterance 195 to the pattern stored in the utterance data 112. For example, the electronic device 101 determines that the pattern of the utterance 195 of "Play singer A's song." is substantially the same as the pattern of "Play XX's song." of the sentence data 113 of FIG. 10.

For example, when the pattern of the utterance 195 of "Play singer A's song." is substantially the same as the pattern of "Play XX's song." stored in the utterance data 112, the electronic device 101 determines the EPD time according to the matching pattern. For example, the electronic device 101 determines the EPD time to be extremely fast (e.g., about 100 ms) according to the matching pattern.

For example, referring to FIGS. 6 to 11, the electronic device 101 determines whether a pattern of the utterance 195 is similar to a pattern stored in utterance data 112. When the pattern of utterance 195 is similar to the pattern stored in the utterance data 112, the electronic device 101 may determine the EPD time according to the pattern.

For example, when the utterance 195 of "weather in city A" is input, the electronic device 101 determines a category of the utterance 195 to be "weather", as shown in FIG. 8.

For example, the electronic device 101 uses the utterance 195 of "weather in city A" and the sentence data 113 of the "weather" category of FIG. 10 to compare the pattern of the utterance 195 to the pattern stored in the utterance data 112. For example, the electronic device 101 determines that the pattern of the utterance 195 of "weather in city A" is similar to the pattern of "weather XX" of the sentence data 113 of FIG. 10.

For example, the electronic device 101 uses a matching probability between the pattern of the utterance 195 and the pattern stored in the utterance data 112 to thus determine whether the pattern of the utterance 195 is substantially the same as, similar to, or dissimilar to the pattern stored in the utterance data 112. For example, the electronic device 101 calculates the matching probability between the pattern of the utterance 195 and the pattern stored in the utterance data 112. For example, the matching probability represents a degree of similarity between the pattern of the utterance 195 and the pattern stored in the utterance data 112.

For example, when the matching probability is greater than a preset first threshold, the electronic device 101 may determine that the pattern of the utterance 195 is substantially the same as the pattern stored in the utterance data 112.

For example, when the match probability is equal to or less than the preset first threshold and greater than a preset second threshold, the electronic device 101 determines that the pattern of the utterance 195 is similar to the pattern stored in the utterance data 112. The magnitude of the second threshold may be set to be less than the magnitude of the first threshold.

For example, when the matching probability is equal to or less than the preset second threshold, the electronic device 101 may determine that the pattern of the utterance 195 is dissimilar to the pattern stored in the utterance data 112.

For example, the electronic device 101 determines the EPD time according to the matching pattern when the pattern of the utterance 195 of "weather in city A" is similar to the pattern of "weather XX" stored in the utterance data 112. For example, the electronic device 101 determines the EPD time to be a fast EPD time (e.g., about 200 ms) according to the similar pattern.

For example, when the utterance 195 of "singer A's song" is input, the electronic device 101 determines that the pattern of the utterance 195 of "singer A's song" is similar to the pattern of "Play XX's song." or "XX's song" stored in the sentence data 113. The electronic device 101 determines the fast EPD time according to the similar pattern when the utterance 195 of "singer A's song" is input.

When the utterance 195 of "singer A's song" is input, even when the sentence type of the utterance 195 is incomplete, the electronic device 101 may determine the user's intent according to the pattern of the utterance 195. Even when an incomplete sentence is input, the electronic device 101 may determine utterance end intent or subsequent utterance intent according to the pattern of the utterance 195 and determine an EPD time.

FIGS. 12A, 12B, 12C, 12D, 12E, 12F, and 12G are diagrams illustrating an EPD time determined by an electronic device (e.g., the electronic device 101 of FIG. 2) for each utterance (e.g., the utterance 195 of FIG. 3), according to various embodiments of the disclosure.

The EPD times shown in FIGS. 12A to 12G may be determined by the electronic device 101 based on an utterance 195 and utterance data (e.g., the utterance data 112 of FIG. 3).

Referring to FIG. 12A, when the utterance 195 of "Call mom" is input, the electronic device 101 may determine an EPD time, using the utterance data 112.

For example, when the pattern and words of the utterance 195 of "Call mom" are substantially the same as the pattern and words stored in the utterance data 112, the electronic device 101 determines the EPD time to be an extremely fast EPD time (e.g., about 100 ms).

For example, in FIG. 12A, the electronic device 101 determines that the utterance 195 is completed according to a user's intent, using the utterance 195 and the utterance data 112, and determines the EPD time to be extremely fast.

Referring to FIGS. 12B and 12C, the electronic device 101 determines the EPD time, using the utterance data 112 when the utterance 195, such as "What is the" or "today's lunch", is input.

For example, by comparing the pattern and words of the utterance 195 of "what is the" or "today's lunch" to the pattern and words stored in the utterance data 112, the electronic device 101 determines the EPD time to be a slow EPD time (e.g., about 1,000 ms).

For example, the electronic device 101 predicts occurrence of the utterance 195, which is subsequently input, from the pattern stored in the utterance data 112, which is similar to the pattern of "what is the" or "today's lunch," and determines the EPD time to be slow.

For example, the electronic device 101 determines the sentence type of the utterance 195 by using the last word "the" from "what is the" or "lunch" from "today's lunch". For example, when the type of the words "the" and "lunch" stored in word data 114 are incomplete or clear incomplete, the electronic device 101 determines that the utterance 195 is not completed.

For example, when the utterance 195, such as "abc" or "what", is additionally input within a determined EPD time (e.g., about 1,000 ms), the electronic device 101 recognizes the utterance 195, which is input additionally.

For example, when the utterance 195 is additionally input, the electronic device 101 uses the utterance 195, which is newly input, to re-determine the EPD time. For example, in FIG. 12B, the electronic device 101 uses the utterance 195 of "what is the", which is previous input, and the utterance 195 of "abc", which is additional input, to compare the pattern of the utterance 195 to the stored pattern. For example, when the pattern of the utterance 195 is substantially the same as the stored pattern, the electronic device 101 determines the EPD time to be a fast EPD time (e.g., about 200 ms) as shown in FIG. 12B.

For example, the electronic device 101 determines the EPD time according to the type of the last word "abc", using the utterance 195 of "abc", which is newly input.

For example, in FIG. 12C, the electronic device 101 compares the pattern of the utterance 195 to the stored pattern by using the utterance 195 of "today's lunch", which is previously input, and the utterance 195 of "what", which is additionally input. For example, when the pattern of the utterance 195 is similar to the stored pattern, the electronic device 101 determines the EPD time to be a fast EPD time (e.g., about 200 ms) as shown in FIG. 12B.

For example, the electronic device 101 receives the utterance 195 in entirety by using the utterance 195, which is previously input, and the utterance 195, which is additionally input. For example, the electronic device 101 identifies the utterance 195, such as "what is the abc" and "what is today's lunch" in FIGS. 12B and 12C, respectively.

In FIGS. 12B and 12C, the electronic device 101 determines whether the patterns of the user's utterances 195 of "What is the abc?" and "What's for lunch today?" are substantially the same as, similar to, or dissimilar to the stored patterns by using the patterns of the utterances 195. The electronic device 101 may determine the EPD time according to whether the pattern of the utterance 195 is the same as, similar to, or dissimilar to the stored pattern and according to the user's utterance intent of the stored pattern.

In FIG. 12C, the utterance 195 may correspond to an incomplete sentence and the pattern of the utterance 195 is similar to the stored pattern. For example, in FIG. 12C, the user's utterance intent of the stored pattern, which is similar to the utterance 195 of "what's for lunch today" may be utterance end intent. The electronic device 101 may determine the user's intent (e.g., utterance end intent or subsequent utterance intent) according to the stored pattern and may determine the EPD time to be a fast EPD time (e.g., about 200 ms).

For example, in FIG. 12C, when the user's utterance intent of the stored pattern, which is similar to the utterance 195 of "what's for lunch today", is a subsequent utterance intent, the electronic device 101 may determine the EPD time to be a slow EPD time (e.g., about 1,000 ms) according to the subsequent utterance intent.

Referring to FIGS. 12D and 12E, the electronic device 101 may determine the EPD time to be an extremely slow EPD time by comparing the pattern of the utterance 195 to the stored pattern. For example, the electronic device 101 determines the EPD time to be the extremely slow EPD time (e.g., about 2,000 ms) by comparing the patterns of the user's utterances 195 of "Baby" and "Hey" to patterns of the utterances 195, which are stored in the utterance data 112 and subsequently input after "Baby" and "Hey".

For example, the electronic device 101 determines the EPD time by using the frequency or the count of the patterns of the utterances 195, which are subsequently input after "Baby" and "Hey" stored in the utterance data 112. For example, the greater the frequency of the patterns of the utterances 195 which are subsequently input after "baby" and "hey" stored in the utterance data 112, the slower EPD time the electronic device 101 determines the EPD time to be.

Referring to FIGS. 12D and 12E, when the utterances 195 are clear incomplete sentences, the electronic device 101 may determine the EPD time to be an extremely slow EPD time. For example, in FIGS. 12D and 12E, when the type of words "baby" and "hey" stored in the word data 114 is clear incomplete, the electronic device 101 may determine the EPD time to be the extremely slow EPD time (e.g. about 2,000 ms).

For example, when the pattern of the utterance 195 is an incomplete sentence with a high utterance frequency or a clear incomplete sentence, the electronic device 101 may determine the EPD time to be an extremely slow EPD time (e.g., about 2,000 ms). For example, based on the pattern of the utterance 195, the electronic device 101 may determine the user's utterance intent to be subsequent utterance intent in the case of an incomplete word or a word with a high utterance frequency. The electronic device 101 may determine the EPD time to be the slow EPD time (e.g., about 2,000 ms) in the case of the incomplete word or the word with the high utterance frequency.

In FIGS. 12D and 12E, when the utterance 195 of "call mom" is additionally input within the EPD time (about 2,000 ms), the electronic device 101 may determine a new EPD time (e.g., about 100 ms). The determining of the new EPD time, considering the utterance 195 additionally input, may be substantially identical to descriptions provided with reference to FIGS. 12B and 12C.

Referring to FIGS. 12F and 12G, a pattern of the utterance 195 of "Suwon" or "hmm" may not be substantially the same as or similar to a stored pattern. The sentence type of the utterance 195 of "Suwon" or "hmm" may correspond to an ambiguous sentence. When the sentence type of the utterance 195 is an ambiguous sentence, the electronic device 101 may determine the EPD time to be a preset EPD time (e.g., about 600 ms).

In FIGS. 12F and 12G, when the utterance 195 of "weather" or "YouTube" is additionally input after the utterance 195 of "Suwon" or "hmm" within an EPD time (e.g., about 600 ms), the electronic device 101 may determine a new EPD time (e.g., about 100 ms).

In FIGS. 12F and 12G, the electronic device 101 according to an embodiment may determine the EPD time based on the user's utterance intent. All of the utterances 195 of "Suwon weather" and "hmm YouTube" in FIGS. 12F and 12G may correspond to clear incomplete sentences in terms of language grammar.

For example, the electronic device 101 may determine the user's utterance intent based on a pattern that is substantially the same as or similar to the utterance 195 even when the utterance 195 is a clear incomplete sentence in terms of language grammar. Based on the user's utterance intent, the electronic device 101 may determine the EPD time to be a fast EPD time or an extremely fast EPD time even when the utterance 195 is the clear incomplete sentence. For example, as shown in FIGS. 12F and 12G, even when the utterance 195 is the clear incomplete sentence, the electronic device 101 may determine the EPD time to be the extremely fast EPD time (e.g., about 100 ms), considering the user's utterance intent.

In FIGS. 12F and 12G, the user's utterance intent of the utterance 195 may be utterance end intent. For example, the electronic device 101 may determine the user's utterance intent of the utterance 195, based on the utterance data 112. For example, in FIG. 12F, when the user's utterance intent having a pattern that is substantially the same as or similar to the utterance 195 of "Suwon weather" is an utterance end intent, the electronic device 101 may determine the user's utterance intent to be the utterance end intent.

For example, the electronic device 101 may use the user's utterance pattern of the utterance data 112 to determine the user's utterance intent of the pattern. For example, when a pattern A is repeatedly input without a subsequent utterance being input, the electronic device 101 may determine that the user's utterance intent corresponding to the pattern A is utterance end intent. For example, when a pattern B is repeatedly input with a subsequent utterance input, the electronic device 101 may determine that the user's utterance intent corresponding to the pattern B is subsequent utterance intent.

For example, the electronic device 101 may compare a preset threshold value to the count of inputs of a pattern stored in the utterance data 112, and the electronic device 101 may determine the user's utterance intent of the pattern. For example, when the pattern A is input more than a set threshold (e.g., 10 times) without a subsequent utterance being input, the electronic device 101 may determine that the user's utterance intent corresponding to the pattern A is utterance end intent.

For example, when the pattern A is input A number times without a subsequent utterance being input and input B number times together with a subsequent utterance, the electronic device 101 may determine the user's utterance intent corresponding to the pattern A by using A number times where the pattern A is input without a subsequent utterance, B number times where the pattern A is input with a subsequent utterance, and the set threshold value. For example, when (A-B) is greater than or equal to the set threshold value, the electronic device 101 may determine that the user's utterance intent corresponding to the pattern A is utterance end intent. For example, when (B-A) is greater than or equal to the set threshold value, the electronic device 101 may determine that the user's utterance intent corresponding to the pattern A is subsequent utterance intent.

FIGS. 13A, 13B, and 13C are diagrams illustrating an operation in which an electronic device (e.g., the electronic device 101 of FIG. 2) determines an EPD time according to an EPD command (e.g., the EPD command 115 of FIG. 3) according to various embodiments of the disclosure.

In an example, the EPD command 115 may include at least one of a forced EPD command 1310, a long pause command 1320, and a reset command 1330.

For example, the forced EPD command 1310 (e.g. utterances "end", "termination", "finish", and the like) and the long pause command 1320 (e.g. utterances "for a moment", "slow", "wait", "hold", and the like) may refer to commands to terminate recognition of an utterance (e.g., the utterance 195 of FIG. 3) according to an EPD time of a preset length when the forced EPD command 1310 or the long pause command 1320 is input to the electronic device 101.

For example, the length of the EPD time corresponding to the forced EPD command 1310 may be set to be extremely fast (e.g., about 100 ms), and the length of the EPD time corresponding to the long pause command 1320 may be set to be extremely slow (e.g., about 2,000 ms).

Referring to FIG. 13A, when the forced EPD command 1310 is input to the electronic device 101 together with an utterance 1, the electronic device 101 may determine the EPD time to be a preset length (e.g., about 100 ms). In FIG. 13A, the electronic device 101 may determine a user's utterance intent to be utterance end intent, based on the forced EPD command 1310. The electronic device 101 may terminate recognition of the utterance 195 earlier than an initially set EPD time (e.g., about 600 ms) according to the utterance end intent and may quickly perform an operation according to the utterance 195, which is input.

Referring to FIG. 13B, when the long pause command 1320 is input to the electronic device 101 together with the utterance 1, the electronic device 101 may determine the EPD time to be a preset length (e.g., about 2,000 ms). In FIG. 13B, the electronic device 101 may determine the user's utterance intent to be subsequent utterance intent based on the long pause command 1320. The electronic device 101 may pause termination of the recognition of the utterance 195 beyond the initially set EPD time (e.g., about 600 ms) according to the intent of a next utterance. The electronic device 101 may identify an utterance 2 input within a preset EPD time (e.g., about 2,000 ms) and the previously input utterance 1, as the utterances 195, according to the intent of the next utterance.

For example, the reset command 1330 may refer to a command for ignoring the utterance 195, which is input before the reset command 1330 is input to the electronic device 101.

For example, referring to FIG. 13C, when the utterance 1, the reset command 1330, and then the utterance 2 are input, the electronic device 101 may determine the EPD time by using only the utterance 2, excluding the utterance 1, which is input before the reset command 1330.

For example, in FIG. 13C, the electronic device 101 may exclude the utterance 1, which is input prior to the reset command 1330, from a subsequent speech recognition operation. For example, in FIG. 13C, an ASR module (e.g., the ASR module 221 of FIG. 2) may transmit text corresponding to only the utterance 2 to an NLU module (e.g., the NLU module 223 of FIG. 2) to perform a subsequent speech recognition operation.

For example, the ASR module 221 may transmit the utterance 195 to the NLU module 223 based on the long pause command 1320 or the reset command 1330.

For example, in FIG. 13B, the ASR module 221 may transfer the utterance 1 and the utterance 2 to the NLU module 223.

For example, in FIG. 13C, the ASR module 221 may not transmit, to the NLU module 223, the utterance 1 input prior to the reset command 1330. For example, the ASR module 221 may transfer the utterance 2 input after the reset command 1330 to the NLU module 223.

An electronic device (e.g., the electronic device 101 of FIG. 2) according to an embodiment may be electrically connected to a processor (e.g., the processor 120 of FIG. 2) and may include a memory (e.g., the memory 130 of FIG. 2) configured to store commands executed by the processor 120. When the commands are executed, the processor 120 may be configured to recognize an utterance (e.g., utterance 195 of FIG. 3). The processor 120 may be configured to determine an EPD time for terminating recognition of the utterance 195, based on utterance data (e.g., the utterance data 112 of FIG. 3) stored in the memory 130. When the utterance 195 is not additionally input within the EPD time, the processor 120 may be configured to terminate the recognition of the utterance 195. The utterance data 112 may include sentence data (e.g., the sentence data 113 of FIG. 3) including a pattern related to a sentence type of the utterance 195 and word data (e.g., the word data 114 of FIG. 3) including a word of the utterance 195.

The processor 120 may be configured to determine a category of the utterance 195. The processor 120 may be configured to determine the EPD time, using the sentence data 113 and the word data 114 corresponding to the category.

The processor 120 may be configured to determine whether the utterance 195 is substantially the same as a pattern stored in the utterance data 112 by using the utterance 195 and the utterance data 112. The processor 120 may be configured to determine the EPD time according to whether the utterance 195 is substantially the same as the pattern.

The processor 120 may be configured to determine whether the utterance 195 is similar to the pattern stored in the utterance data 112 by using the utterance 195 and the utterance data 112. The processor 120 may be configured to determine the EPD time according to whether the utterance 195 is similar to the pattern.

The processor 120 may be configured to determine the EPD time based on a frequency of the pattern.

The processor 120 may be configured to determine whether the utterance 195 is a complete sentence, using the utterance 195 and the utterance data 112. The processor 120 may be configured to determine the EPD time according to whether the utterance 195 is the complete sentence.

The processor 120 may be configured to determine whether the utterance 195 is an incomplete sentence, using the utterance 195 and the utterance data 112. The processor 120 may be configured to determine the EPD time according to whether the utterance 195 is the incomplete sentence.

The processor 120 may be configured to identify whether the utterance 195 includes a preset EPD command (e.g., the EPD command 115 of FIG. 3). The processor 120 may be configured to determine the EPD time according to the EPD command 115.

The processor 120 may be configured to update the utterance data 112 according to a preset update criterion.

An electronic device (e.g., the electronic device 101 of FIG. 2) according to an embodiment may be electrically connected to a processor (e.g., the processor 120 of FIG. 2) and may include a memory (e.g., the memory 130 of FIG. 2) configured to store commands executed by the processor 120. The processor 120 may be configured to determine a category of an utterance when the commands are executed. Based on utterance data (e.g., the utterance data 112 of FIG. 3) corresponding to the category, the processor 120 may be configured to compare a pattern of the utterance (e.g., the utterance 195 of FIG. 3) to a pattern stored in utterance data 112. When the pattern of the utterance 195 is different from the pattern stored in the utterance data 112, the processor 120 may be configured to determine whether the utterance 195 is a complete sentence, an incomplete sentence, or an ambiguous sentence. The processor 120 may be configured to determine an EPD time for terminating recognition of the utterance 195, based on at least one of a result of the comparing of the pattern of the utterance 195 to the pattern stored in the utterance data 112 and whether the utterance 195 is the complete sentence, the incomplete sentence, or the ambiguous sentence; and when the utterance 195 is not additionally input within the EPD time, the processor 120 may be configured to terminate the recognition of the utterance 195. The utterance data 112 may include sentence data (e.g., the sentence data 113 of FIG. 3) including the pattern related to a sentence type of the utterance 195 and word data (e.g., the word data 114 of FIG. 3) including a word of the utterance 195.

The processor 120 may be configured to determine whether the utterance 195 is substantially the same as the pattern stored in the utterance data 112 by using the utterance 195 and the utterance data 112. The processor 120 may be configured to determine the EPD time according to whether the utterance 195 is substantially the same as the pattern.

The processor 120 may be configured to determine whether the utterance 195 is similar to the pattern stored in the utterance data 112 by using the utterance 195 and the utterance data 112. The processor 120 may be configured to determine the EPD time according to whether the utterance 195 is similar to the pattern.

The processor 120 may be configured to determine the EPD time based on a frequency of the pattern.

A method for determining an EPD time according to an embodiment may include recognizing an utterance (e.g., the utterance 195 of FIG. 3), determining an EPD time for terminating recognition of the utterance 195 based on utterance data (e.g., the utterance data 112 of FIG. 3) stored in a memory (e.g., the memory 130 of FIG. 2), and when the utterance 195 is not additionally input within the EPD time, terminating the recognition of the utterance 195. The utterance data 112 may include sentence data (e.g., the sentence data 113 of FIG. 3) including a pattern related to a sentence type of the utterance 195 and word data (e.g., the word data 114 of FIG. 3) including a word of the utterance 195.

The determining of the EPD time may further include determining a category of the utterance. The determining of the EPD time may determine the EPD time, using the sentence data 113 and the word data 114 corresponding to the category.

The determining of the EPD time may include determining whether the utterance 195 is the same as the pattern stored in the utterance data 112, using the utterance 195 and the utterance data 112. The determining of the EPD time may include determining the EPD time according to whether the utterance 195 is substantially the same as the pattern.

The determining of the EPD time may include determining whether the utterance 195 is similar to the pattern stored in the utterance data 112 by using the utterance 195 and the utterance data 112. The determining of the EPD time may include determining the EPD time according to whether the utterance 195 is similar to the pattern.

The determining of the EPD time may include determining whether the utterance 195 is a complete sentence, using the utterance 195 and the utterance data 112. The determining of the EPD time may include determining the EPD time according to whether the utterance 195 is the complete sentence.

The determining of the EPD time may include determining whether the utterance 195 is an incomplete sentence, using the utterance 195 and the utterance data 112. The determining of the EPD time may include determining the EPD time according to whether the utterance 195 is the incomplete sentence.

The electronic device according to embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof. Terms such as "1$^{st}$" "2$^{nd}$," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., by wire), wirelessly, or via a third element.

As used in connection with embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
memory storing instructions; and
at least one processor communicatively coupled to the memory, wherein the instructions, when executed by the at least one processor individually or collectively, cause the electronic device to:

recognize an utterance that is input, determine an End Point Detection (EPD) time for terminating recognition of the utterance, based on a result of comparing a pattern of the utterance to utterance data stored in the memory, when the utterance is not additionally input within the EPD time, terminate the recognition of the utterance, determine a user input based on the recognized utterance, based on the recognition of the utterance being terminated, perform at least one operation based on the determined user input, and provide at least one of a visual output via a display or a sound output via a speaker, based on the at least one operation being performed, and wherein the utterance data comprises:

sentence data, which comprises a pattern related to a sentence type of the utterance, and word data, which comprises a word of the utterance.

2. The electronic device of claim 1, wherein the instructions, when executed by the at least one processor individually or collectively, further cause the electronic device to:

determine a category of the utterance, and determine the EPD time, using the sentence data and the word data corresponding to the category.

3. The electronic device of claim 1, wherein the instructions, when executed by the at least one processor individually or collectively, further cause the electronic device to:

determine whether the pattern of the utterance is substantially the same as the pattern of the utterance data, and determine the EPD time according to whether the utterance is substantially the same as the pattern.

4. The electronic device of claim 1, wherein the instructions, when executed by the at least one processor individually or collectively, further cause the electronic device to:

determine whether the pattern of the utterance is similar to the pattern of the utterance data, and determine the EPD time according to whether the utterance is similar to the pattern.

5. The electronic device of claim 1, wherein the instructions, when executed by the at least one processor individually or collectively, further cause the electronic device to:

determine the EPD time based on a frequency of the pattern of the utterance.

6. The electronic device of claim 1, wherein the instructions, when executed by the at least one processor individually or collectively, further cause the electronic device to:

determine whether the utterance is a complete sentence, using the utterance and the utterance data, and determine the EPD time according to whether the utterance is the complete sentence.

7. The electronic device of claim 1, wherein the instructions, when executed by the at least one processor individually or collectively, further cause the electronic device to:

determine whether the utterance is an incomplete sentence, using the utterance and the utterance data, and determine the EPD time according to whether the utterance is the incomplete sentence.

8. The electronic device of claim 1, wherein the instructions, when executed by the at least one processor individually or collectively, further cause the electronic device to:

identify whether the utterance comprises an EPD command, which is preset, and determine the EPD time according to the EPD command.

9. The electronic device of claim 1, wherein the instructions, when executed by the at least one processor individually or collectively, further cause the electronic device to:

update the utterance data according to a preset update criterion.

10. The electronic device of claim 1, wherein a plan for performing the at least one operation is generated or selected by an artificial intelligence (AI) system based on the determined user input, and wherein the at least one operation is performed based on the plan.

11. An electronic device comprising:

memory storing instructions; and at least one processor communicatively coupled to the memory, wherein the instructions, when executed by the at least one processor individually or collectively, cause the electronic device to:

recognize an utterance that is input, determine a category of the utterance, compare a pattern of the utterance to a pattern of utterance data corresponding to the category that is stored in the memory, when the pattern of the utterance is different from the pattern of the utterance data, determine whether the utterance is a complete sentence, an incomplete sentence, or an ambiguous sentence, determine an End Point Detection (EPD) time for terminating recognition of the utterance, based on at least one of a result of the comparing of the pattern of the utterance to the pattern of the utterance data, or whether the utterance is the complete sentence, the incomplete sentence, or the ambiguous sentence, when the utterance is not additionally input within the EPD time, terminate the recognition of the utterance, determine a user input based on the recognized utterance, based on the recognition of the utterance being terminated, perform at least one operation based on the determined user input, and provide at least one of a visual output via a display or a sound output via a speaker, based on the at least one operation being performed, and wherein the utterance data comprises:

sentence data, which comprises the pattern related to a sentence type of the utterance, and word data, which comprises a word of the utterance.

12. The electronic device of claim 11, wherein the instructions, when executed by the at least one processor individually or collectively, further cause the electronic device to:

determine whether the pattern of the utterance is substantially the same as the pattern of the utterance data, and determine the EPD time according to whether the utterance is substantially the same as the pattern.

13. The electronic device of claim 11, wherein the instructions, when executed by the at least one processor individually or collectively, further cause the electronic device to:

determine whether the pattern of the utterance is similar to the pattern of the utterance data, and determine the EPD time according to whether the utterance is similar to the pattern.

14. The electronic device of claim 11, wherein the instructions, when executed by the at least one processor individually or collectively, further cause the electronic device to;

determine the EPD time based on a frequency of the pattern of the utterance.

15. The electronic device of claim 11, wherein a plan for performing the at least one operation is generated or selected by an artificial intelligence (AI) system based on the determined user input, and wherein the at least one operation is performed based on the plan.

16. A method performed by an electronic device, the method comprising:

recognizing an utterance that is input;

determining an End Point Detection (EPD) time for terminating recognition of the utterance, based on a result of comparing a pattern of the utterance to utterance data stored in a memory of the electronic device;

when the utterance is not additionally input within the EPD time, terminating the recognition of the utterance;

determining a user input based on the recognized utterance;

based on the recognition of the utterance being terminated, performing at least one operation based on the determined user input; and providing at least one of a visual output via a display or a sound output via a speaker, based on the at least one operation being performed, wherein the utterance data comprises:

sentence data, which comprises a pattern related to a sentence type of the utterance, and word data, which comprises a word of the utterance.

17. The method of claim 16, further comprising determining a category of the utterance, wherein the determining of the EPD time comprises determining the EPD time, using the sentence data and the word data corresponding to the category.

18. The method of claim 16, wherein the determining of the EPD time comprises:

determining whether the pattern of the utterance is substantially the same as the pattern of the utterance data; and determining the EPD time according to whether the utterance is substantially the same as the pattern.

19. The method of claim 16, wherein the determining of the EPD time comprises:

determining whether the pattern of the utterance is similar to the pattern of the utterance data; and determining the EPD time according to whether the utterance is similar to the pattern.

20. The method of claim 16, wherein a plan for performing the at least one operation is generated or selected by an artificial intelligence (AI) system based on the determined user input, and wherein the at least one operation is performed based on the plan.

* * * * *